US012711480B2

(12) United States Patent
Senci et al.

(10) Patent No.: US 12,711,480 B2
(45) Date of Patent: Aug. 18, 2026

(54) SYSTEMS AND METHODS FOR A PAYMENT DEVICE WITH CARDHOLDER SELECTED TRANSACTION PREFERENCES

(71) Applicant: Mastercard International Incorporated, Purchase, NY (US)

(72) Inventors: David J. Senci, Troy, IL (US); Kyle T. Williams, Wentzville, MO (US); Johan Gerber, Wildwood, MO (US)

(73) Assignee: Mastercard International Incorporated, Purchase, NY (US)

(*) Notice: Subject to any disclaimer, the term of this patent is extended or adjusted under 35 U.S.C. 154(b) by 481 days.

(21) Appl. No.: 18/312,923

(22) Filed: May 5, 2023

(65) Prior Publication Data

US 2024/0370842 A1 Nov. 7, 2024

(51) Int. Cl.

*G06Q 20/20* (2012.01)
*G06Q 20/34* (2012.01)
*G06Q 20/40* (2012.01)

(52) U.S. Cl.

CPC ......... *G06Q 20/204* (2013.01); *G06Q 20/341* (2013.01); *G06Q 20/4012* (2013.01)

(58) Field of Classification Search

CPC . G06Q 20/204; G06Q 20/341; G06Q 20/4012
See application file for complete search history.

(56) References Cited

U.S. PATENT DOCUMENTS 8,016,191 B2 * 9/2011 Bonalle ................ G06Q 20/341 235/487
2015/0046340 A1 * 2/2015 Dimmick .............. G06Q 20/40 705/72
2016/0148482 A1 * 5/2016 Branch ................ G08B 21/088 340/573.6
2016/0321634 A1 * 11/2016 George ................ G06Q 20/202
2017/0116635 A1 * 4/2017 Gantert .............. G06Q 30/0226
2017/0148003 A1 * 5/2017 Lopez ................ G06Q 30/0279
2018/0053157 A1 * 2/2018 Roffey ............. G06K 19/06206

(Continued)

OTHER PUBLICATIONS https://web.archive.org/web/20190323013229/https://en.wikipedia.org/wiki/ISO_8583 (Year: 2019).*

*Primary Examiner* — Florian M Zeender
*Assistant Examiner* — Joseph M Mutschler
(74) *Attorney, Agent, or Firm* — Hovey Wiliams LLP

(57) ABSTRACT

A system and method for using user-selected transactions preferences stored on a payment card in a transaction includes transmitting a cold reset signal to the payment card. An answer-to-reset message is received from the payment card. The answer-to-reset message includes governing rules for performing a transaction, including user-selected transaction preferences data associated with one or more user-selected transaction preferences for performing the transaction. The process also includes receiving payment account details for a payment account associated with the payment card. A payment authorization request message is transmitted to an interchange network. The request message includes one or more data elements associated with the user-selected transaction preferences data. A payment authorization request response message is then received from the interchange network, based on the transaction preferences. One or more of the user-selected transaction preferences is then executed.

5 Claims, 13 Drawing Sheets

(56) References Cited

U.S. PATENT DOCUMENTS

| | | | | |
|---|---|---|---|---|
| 2018/0189781 | A1* | 7/2018 | McCann | G06Q 20/202 |
| 2021/0042743 | A1* | 2/2021 | Green | G07F 19/206 |
| 2021/0224777 | A1* | 7/2021 | Bishnoi | G06Q 20/3265 |
| 2023/0206193 | A1* | 6/2023 | Deshpande | G06Q 20/389<br>705/39 |

* cited by examiner

SYSTEMS AND METHODS FOR A PAYMENT DEVICE WITH CARDHOLDER SELECTED TRANSACTION PREFERENCES

FIELD OF THE DISCLOSURE

The field of the disclosure relates generally to a payment device associated with cardholder selected transaction preferences and, more particularly, to systems and methods for automatically applying one or more cardholder selected transaction preferences to a transaction.

BACKGROUND OF THE DISCLOSURE

Merchants and financial institutions are faced with a rapidly changing digital ecosystem driven by increased customer expectations, friction related to evolving digital commerce, and acceleration in digital transformation. For merchants, payment processors, and financial institutions to remain competitive and maintain customer loyalty, these organizations must offer an elevated customer experience, provide purchase transparency, accelerate their digital ecosystem, and provide hyper-customization for their account holders/customers. Customers today expect highly customizable omni-channel shopping experiences automatically tailored to their needs, but also with the ability for the customer to customize the experience based on their needs.

BRIEF DESCRIPTION OF THE DISCLOSURE

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a system is provided. The system includes a payment card having a micromodule. The micromodule has a primary memory component storing payment account details for a payment account, a PIN associated with the payment account, and governing rules for performing a transaction. The governing rules include user-selected transaction preferences data associated with one or more user-selected transaction preferences for performing a transaction. The system also includes a point-of-sale device (POS). The POS includes a processor and a payment card reader/writer component. The processor is programmed by computer-executable instructions to transmit a cold reset signal to the micromodule. The processor is also programmed to receive an answer-to-reset message from the micromodule. The answer-to-reset message includes the user-selected transaction preferences data. Furthermore, the processor is programmed to receive the payment account details from the micromodule and to transmit a payment authorization request message to an interchange network. The payment authorization request message includes one or more data elements associated with the user-selected transaction preferences data. The processor is further programmed to receive a payment authorization request response message, based on the user-selected transaction preferences data, from the interchange network. The processor then executes one or more of the user-selected transaction preferences.

In another aspect, a computer-implemented method is provided. The method includes transmitting a cold reset signal to a payment device. The method also includes receiving an answer-to-reset message from the payment device. The answer-to-reset message includes governing rules for performing a transaction. The governing rules include user-selected transaction preferences data associated with one or more user-selected transaction preferences for performing a transaction. The method includes receiving payment account details for a payment account associated with the payment device. Furthermore, the method includes transmitting a payment authorization request message to an interchange network. The payment authorization request message includes one or more data elements associated with the user-selected transaction preferences data. The method also includes receiving a payment authorization request response message, based on the user-selected transaction preferences data, from the interchange network. Moreover, the method includes executing one or more of the user-selected transaction preferences.

In yet another aspect, a computer-implemented method is provided. The method includes presenting, on a graphical user interface, one or more options to update user-selected transaction preferences data on a payment card. The user-selected transaction preferences data is associated with one or more user-selected transaction preferences for performing a transaction. The method includes receiving, via the graphical user interface, a selection of one of the options and performing one or more operations of the selected option. Furthermore, the method includes generating user-selected changes to the payment card. The method also includes writing the user selected changes to a user data memory component of the payment card as user-selected transaction preferences data.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION OF THE DISCLOSURE

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled.

As used herein, the term “database” includes either a body of data, a relational database management system (RDBMS), or both. As used herein, a database includes, for example, and without limitation, a collection of data including hierarchical databases, relational databases, flat file databases, object-relational databases, object-oriented databases, and any other structured collection of records or data that is stored in a computer system. Examples of RDBMS’s include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL. However, any database may be used that enables the systems and methods to operate as described herein.

Exemplary Payment Devices

Figure 1:
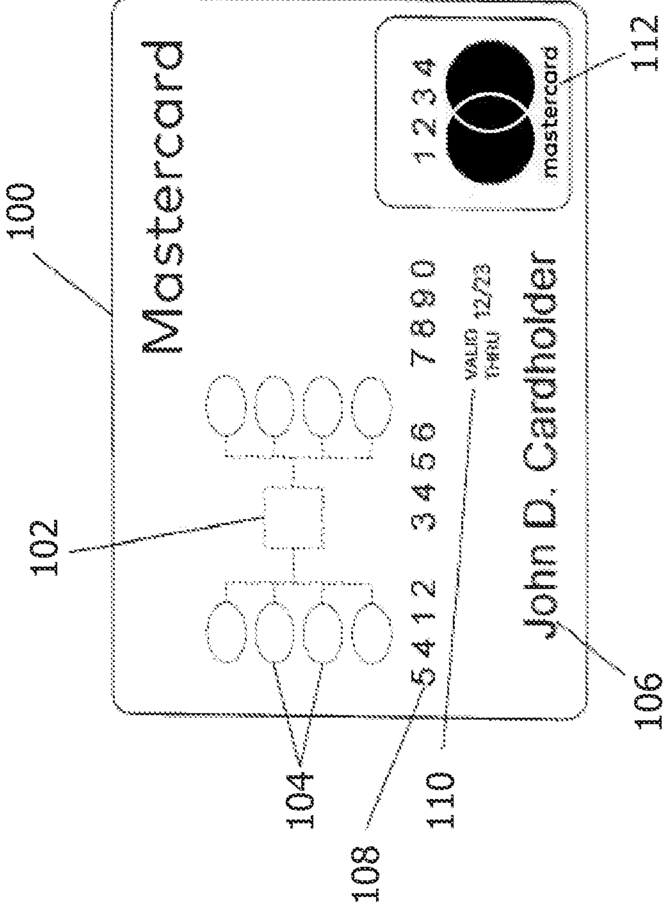
FIG. 1 is a schematic front view of a payment card.
Figure 2:
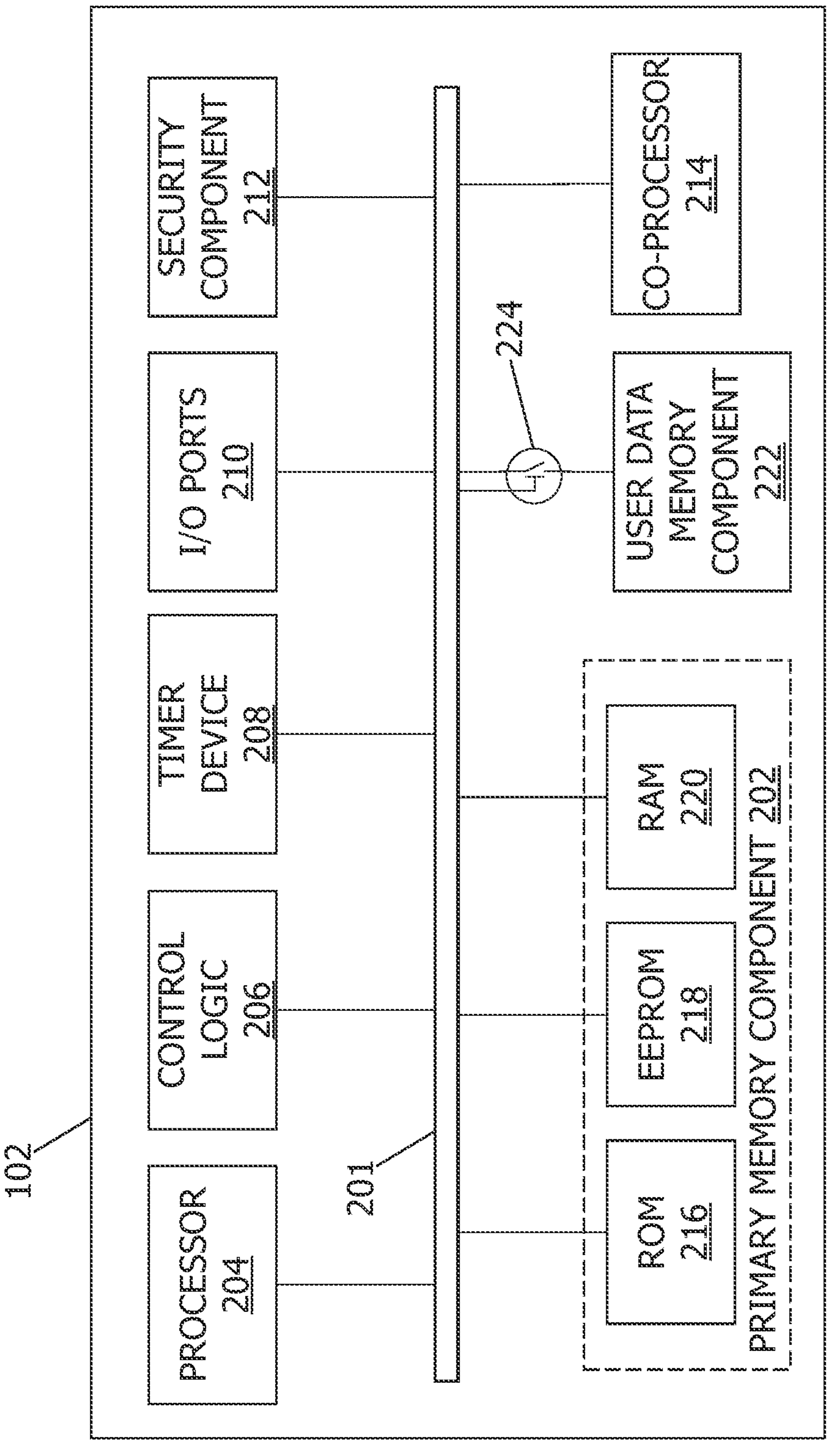
FIG. 2 is a block diagram of the micromodule of the payment card shown in FIG. 1.

FIG. 1 is a schematic front view of a payment card 100. FIG. 2 is a block diagram of the micromodule 102. In the exemplary embodiment, the payment card 100 includes an embedded integrated circuit (IC) or micromodule 102 that stores and transmits transaction data and transaction preferences data between electronic devices. The micromodule 102 includes a single silicon integrated circuit chip with at least a primary memory component 202 (shown in FIG. 2), an access-controlled user data memory component 222 (shown in FIG. 2), and a processor 204 (shown in FIG. 2). In the exemplary embodiment, the transaction data stored on the micromodule 102 is associated with at least one payment account linked to a funding source.

As shown in FIG. 1, the micromodule 102 includes a plurality of electrical contacts 104 for communication between the payment card 100 and a point-of-sale (POS) terminal 606 (shown in FIG. 5), an automated teller machine (ATM) (shown in FIG. 5), and/or any other machine capable of reading and/or writing to the payment card 100 to perform transactions and/or update preferences data, respectively. In the exemplary embodiment, the micromodule 102 includes eight (8) electrical contacts 104. The ISO/IEC 7816-2 standard includes assignments for at least power supply voltage (VCC), reset (RST) used to reset the microprocessor, clock signal (CLK), serial input/output (I/O), and ground (GRD) signals for the electrical contacts 104. In some embodiments, the micromodule 102 may include fewer or more electrical contacts 104.

In the exemplary embodiment, the payment card 100 may be configured as a credit card, a debit card, and/or a stored value card (i.e., a payment card containing monetary value that can be transferred when a cardholder performs a payment transaction). As shown in FIG. 1, the payment card 100 preferably includes a cardholder’s name 106 and a logo 112 of a financial company whose services are used by the cardholder (e.g., Mastercard®). (Mastercard is a registered trademark of Mastercard International Incorporated.) In addition, the payment card 100 may include a primary account number (PAN) 108 and an expiration date 110. The PAN may correspond to a primary account included in transaction data stored on the payment card 100, for example, in the micromodule 102 and/or the magnetic strip (not shown).

Referring to FIG. 2, in the exemplary embodiment, the micromodule 102 includes a system bus 201 linking the primary memory component 202, the processor 204, control logic 206, a timer device 208, input/output ports 210, a security component 212, a co-processor 214, and the access-controlled user data memory component 222 together in communication. The control logic 206 is configured to operate in conjunction with the processor 204 to provide control for handling communications between the primary memory component 202 and the input/output ports 210. The timer device 208 facilitates providing a timing reference signal for the processor 204 and the control logic 206. The security component 212 preferably provides fusible links (not shown) that connect the input/output ports 210 to internal circuitry (not shown) for testing during manufacturing. The fusible links (not shown) are subsequently broken after completion of testing to facilitate limiting access to sensitive circuit areas. The co-processor 214 is configured to perform complex computations in real time, such as those required by cryptographic algorithms.

In the example embodiment, the user data memory component 222 is coupled to the system bus via an electronic switch 224. Alternatively, the user data memory component 222 may be coupled to the system bus without the intervening electronic switch 224. In the example, the electronic switch 224 includes, for example, a transistor, a logic gate, a MOSFET, thyristor, and/or any other type of electronic switch that enables the micromodule 102 to function as described herein. The electronic switch 224 limits access to the user data memory component 222 by opening and closing a circuit coupled to user data memory component 222 only when certain requirements are met. The electronic switch 224 is actuated by at least one of the processor 204 and/or the co-processor 214. When the processor 204 and/or the co-processor 214 determines that the certain requirements are met, the processor 204 and/or the co-processor 214 closes the circuit to enable access to user data (e.g., transaction preference data) stored thereon. In the exemplary embodiment, the user data memory component 222 includes, for example, non-volatile, programmable memory that can be updated.

The primary memory component 202 may include different types of memory, such as volatile and non-volatile memory, and read-only and programmable memory. For example, as shown in FIG. 2, the primary memory component 202 may include read-only memory (ROM) 216, electrically erasable programmable read-only memory (EEPROM) 218, and random-access memory (RAM) 220.

Figure 3:
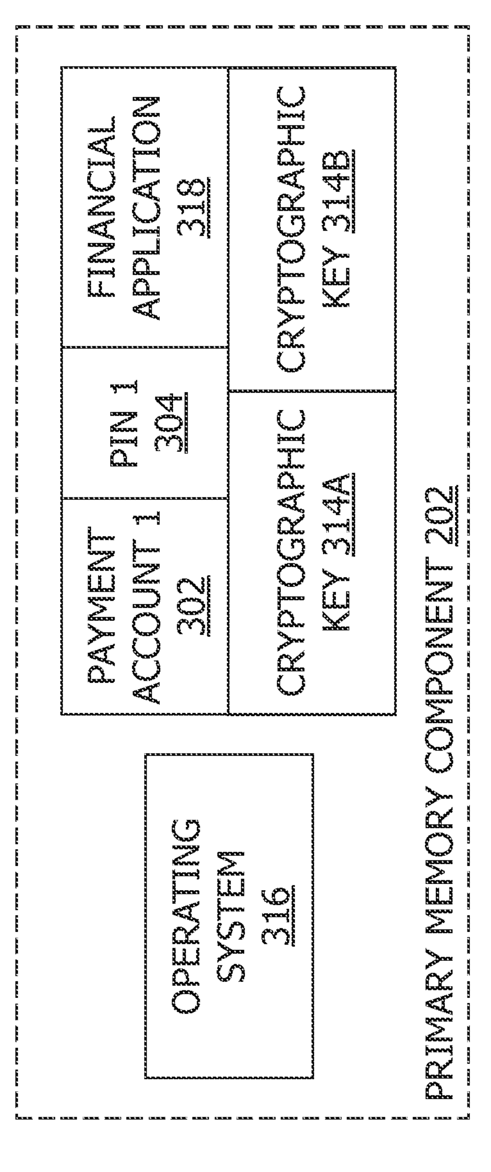
FIG. 3 is a data diagram of a primary memory component of the micromodule shown in FIG. 2.

FIG. 3 is a data diagram of the primary memory component 202. In the exemplary embodiment, the primary memory component 202 stores unique transaction data such as payment account data 302 linked to a funding source. In addition, the primary memory component 202 stores unique PIN data 304 corresponding to the payment account data 302. The unique PIN data 304 may be used to lock and unlock access to the payment account data 302 on the payment card 100. Furthermore, the payment card 100 includes one or more cryptographic keys 314A and 314B, which are strings of data (e.g., data bits) used by a cryptographic algorithm to transform plain text into cipher text and/or vice versa. The cryptographic keys 314A and 314B may be any type of known cryptographic keys generated by a cryptographic algorithm, such as private keys of public-key pairs. The cryptographic keys 314A and 314B are used for authentication of the transaction data (e.g., the account data 302, PIN data 304, etc.) stored in the micromodule 102. The unique PIN data 304 and the cryptographic keys 314A and 314B are preferably stored in a secure area of the ROM 216 or the EEPROM 218.

In the exemplary embodiment, the primary memory component 202 also stores an operating system 316 of the payment card 100 and a financial application 318. For example, the financial application 318 may be the Mastercard debit application that operates to process debit transactions on the Mastercard interchange network. The operating system 316 loads and executes the financial application 318 and provides file management and other basic card services to the financial application 318. In addition, the operating system 316 handles transmission of an answer-to-reset (ATR) message in response to a reset signal, as described further herein. In one embodiment, the operating system 316 is preferably stored in a secure area of ROM 216.

The financial application 318 may include program files and associated data files, which may be stored in the EEPROM 218. The financial application 318 may be written either in the native programming code of the processor 204 or it may be written in a higher-level language that must be translated before it is executed on the processor 204. The use of a higher-level language facilitates enabling the financial application 318 to execute or run on multiple hardware platforms without any need for re-writing.

Figure 4:
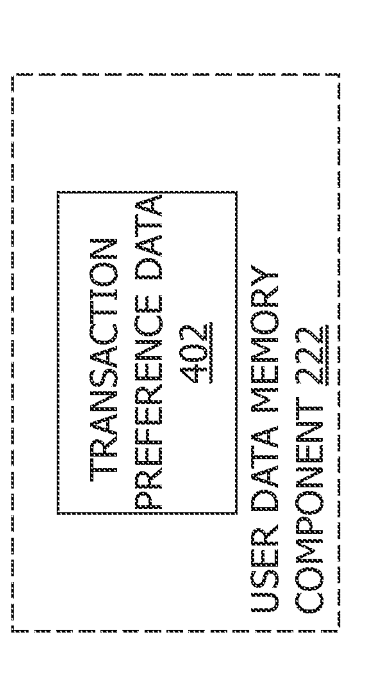
FIG. 4 is a data diagram of a user data memory component of the micromodule shown in FIG. 2

FIG. 4 is a data diagram of the user data memory component 222. In the exemplary embodiment, the user data memory component 222 stores user transaction preference information/data 402. In the exemplary embodiment, the user transaction preference information/data 402 is user selectable and can be written to the payment card 100 when the card is generated for the customer and/or written/updated upon request, for example, at a POS terminal, ATM, or other electronic device capable of writing to the payment card 100. The transaction preference information/data 402 may be used to automatically apply or select certain transaction preferences and enable a transaction to proceed using the payment account data 302 (shown in FIG. 3) and the selected preferences. As discussed herein, the transaction preferences include, without limitation, receipt preferences, automatic tipping, automatic rewards redemption, "rounding up" for charity, warranty preferences, authentication preferences, store card-on-file preferences, etc.

Figure 5:
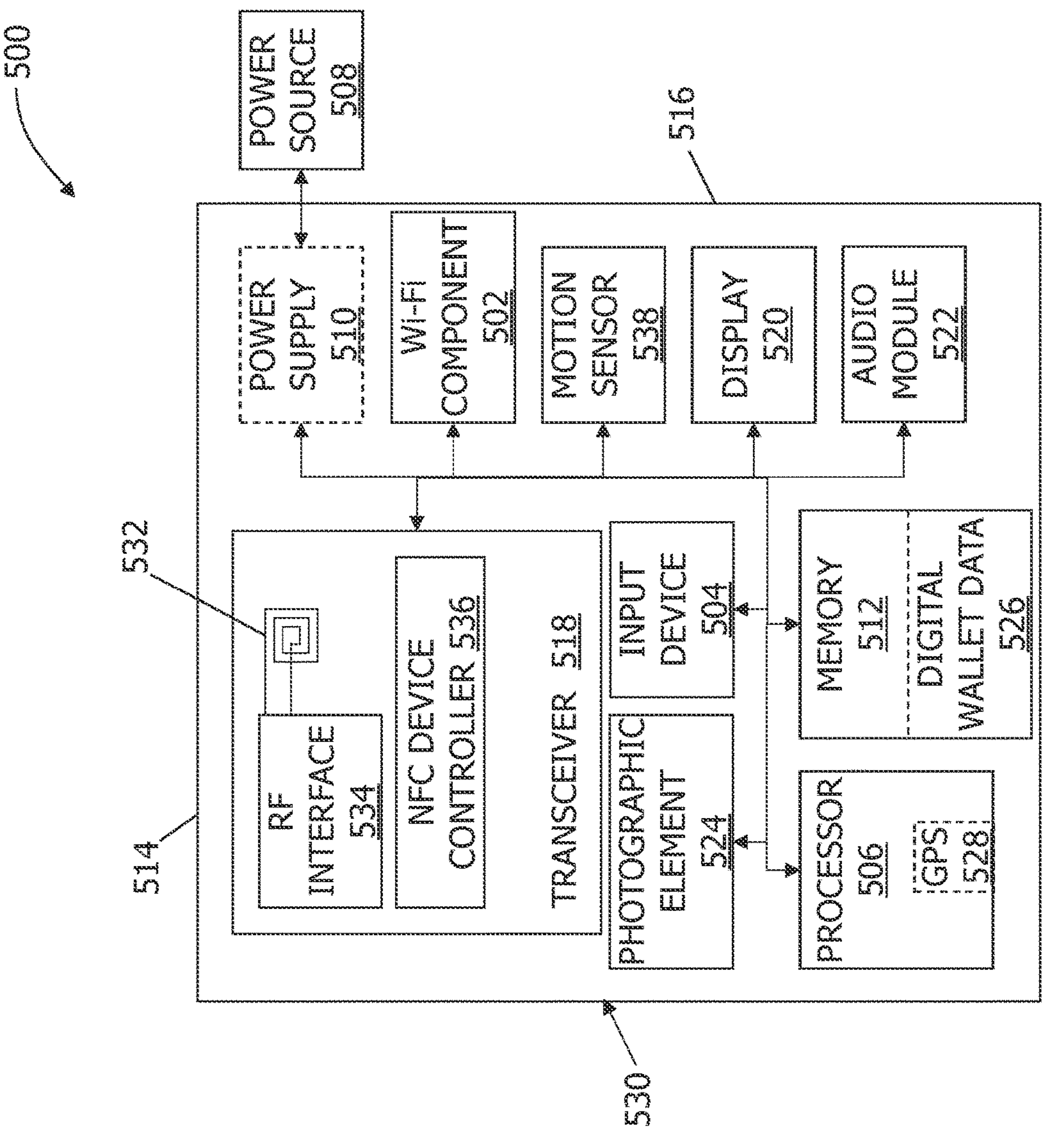
FIG. 5 is a block diagram illustrating an example user computing system.

FIG. 5 is an example configuration of a user computing system 500, such as a mobile device or mobile phone, that may be operated by a user, such as the cardholder 602 (shown in FIG. 6), as a payment or transaction device. In the exemplary embodiment, the computing system 500 is a computing device configured to connect wirelessly to one or more of a point-of-sale (POS) system, such as the POS 606; an automatic teller machine (ATM), such as the ATM 616; a merchant 604, an interchange network 612, an issuer 614, a network 618, and any other computing devices, such as other consumer computing devices (each shown in FIG. 6).

In the exemplary embodiment, the computing system 500 generally includes a processor 506, a memory device 512, a transceiver 518 (or a wireless communication device), and a photographic element 524. In addition, the computing system 500 includes an integrated Wi-Fi component 502 (e.g., implementing the Institute of Electrical and Electronics/IEEE 802.11 family of standards), an input device 504, a display 520, and an audio module 522. Moreover, the computing system 500 optionally includes an internal power supply 510 (e.g., a battery or other self-contained power source) to receive power, or alternatively, in some embodiments, the computing system 500 may include an external power source 508. Optionally, the computing system 500 may include a motion sensor 538.

The processor 506 includes one or more processing units (e.g., in a multi-core configuration) specially programmed for executing computer readable instructions. The instructions may be executed within a variety of different operating systems (OS) on the mobile device 40, such as UNIX, LINUX, Microsoft Windows®, etc. More specifically, the instructions may cause various data manipulations on data stored in the memory device 512 (e.g., create, read, write, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.). The memory device 512 is any device allowing information such as digital wallet data 526, the executable instructions, and/or written works to be stored and retrieved. The memory device 512 includes one or more computer readable media.

In the example, the digital wallet data 526 includes data substantially similar to the data stored on the payment card 100. For example, the digital wallet data 526 may include the payment account data 302 and the unique PIN data 304 corresponding to the payment account data 302. The unique PIN data 304 may be used to lock and unlock access to the payment account data 302. Furthermore, the digital wallet data 526 may include the one or more cryptographic keys 314A and 314B. The cryptographic keys 314A and 314B may be used for authentication of the digital wallet data 526 (e.g., the account data 302, PIN data 304, etc.) stored in the memory device 512. In addition, the digital wallet data 526 may include the transaction preference information/data 402.

In the example embodiment, the processor 506 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

Because the computing system 500 may be widely deployed, it may be impractical to manually update software for each computing system 500. Therefore, the network system 10 provides a mechanism for automatically updating the software on the computing system 500. For example, an updating mechanism may be used to automatically update any number of components and their drivers, both network and non-network components, including system level (OS) software components. In some embodiments, the computing system 500 components are dynamically loadable and unloadable; thus, they may be replaced in operation without having to reboot the OS.

A location of the computing system 500 can be obtained through conventional methods, such as a location service (e.g., global positioning system (GPS) service) in the computing system 500, "ping" data that includes geotemporal data, from cell location register information held by a telecommunications provider to which the computing system 500 is connected, and the like. For example, in one suitable embodiment, an optional GPS chip 528 can be part of or separate from the processor 506 to enable the location of the computing system 500 to be determined.

Figure 7:
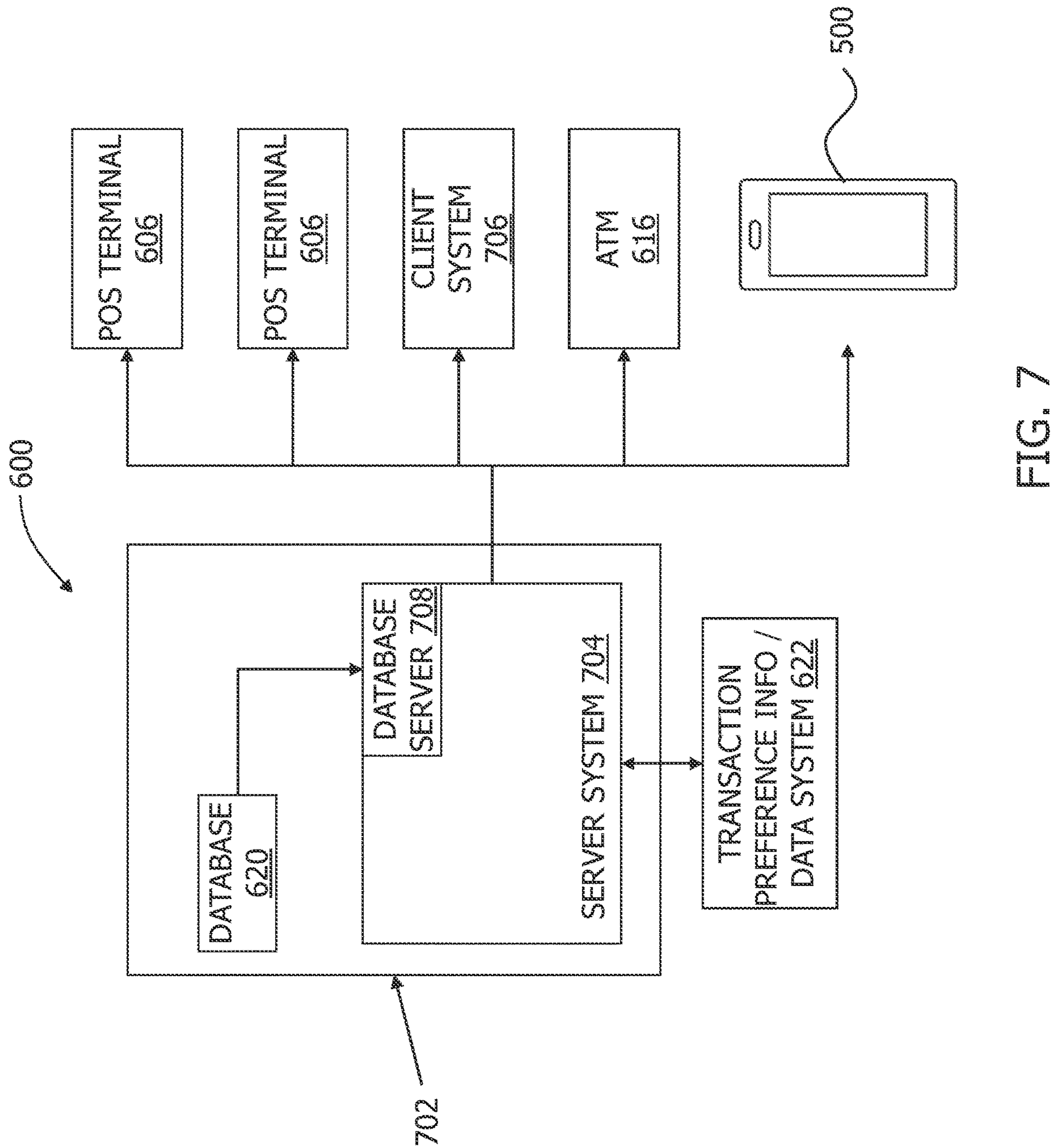
FIG. 7 is a simplified block diagram of an example payment network system, such as the payment network system shown in FIG. 6, including a plurality of computing devices and a server system.

The Wi-Fi component 502 (broadly, a communication interface) may be communicatively connectable to a remote device such as POS 606, ATM 616, the network 618, and/or a server system 704 (shown in FIG. 7). The Wi-Fi component 502 may include, for example, a wireless or wired network adapter or a wireless data transceiver for use with Wi-Fi (e.g., implementing the Institute of Electrical and Electronics/IEEE 802.11 family of standards), Bluetooth communication, radio frequency (RF) communication, near field communication (NFC), and/or with a mobile phone network, Global System for Mobile communications (GSM), 3G, or other mobile data network, and/or Worldwide Interoperability for Microwave Access (WiMax) and the like.

Stored in the memory device 512 are, for example, computer readable instructions for providing a user interface to the user, such as the cardholder 602, via the display 520 and, optionally, receiving and processing input from the input device 504. A user interface may include, among other possibilities, a web browser and a client application. Web browsers enable users, such as the cardholder 602, to display and interact with media and other information typically embedded on a web page or a website. A client application allows the cardholder 602 to interact with a server application, for example, associated with a merchant.

The photographic element 524 may include a camera or other optical sensor and lens combination capable of generating a video signal and capturing an image, iris scan, and the like. In various embodiments, the photographic element 524 may be integrated in a housing or body, such as a housing 514, of the computing system 500. When the photographic element 524 captures an image or otherwise generates image data (e.g., video data), the photographic element 524 may store the image data in a data file, either in a raw or compressed format, in the memory device 512.

In some embodiments, the motion sensor 538 may include one or more sensor elements that facilitate detecting a person's presence. For example, the motion sensor 538 may detect when the cardholder 602 moves or raises the user consumer system 500. Upon detection of such motion, the photographic element 524 may begin capturing images (e.g., still or video images), the transceiver 518 may be activated, and/or the audio module 522 may begin capturing audio. The motion sensor 538 may be operatively coupled to the photographic element 524 such that the consumer's presence may be detected by detecting motion using the photographic element 524. The motion sensor 538 may include, for example, and without limitation, sensor elements such as a passive infrared sensor, an ambient light sensor, and the like.

In the example embodiment, the display 520 can include, for example, and without limitation, a liquid crystal display (LCD), an organic light emitting diode (OLED) display, or an "electronic ink" display. In some embodiments, a single component such as a touch screen may function as both an output device (e.g., the display 520) and the input device 504. As such, the display 520 may optionally include a touch controller for support of touch capability. In such embodiments, the computing system 500 may detect a user's presence by detecting that the user has touched the display 520 of the computing system 500.

The audio module 522 may include, for example, and without limitation, a speaker and related components capable of broadcasting streaming and/or recorded audio and may also include a microphone. The microphone facilitates capturing audio through the computing system 500.

In the example embodiment, the computing system 500 includes the housing 514 at least partly (and more preferably, at least substantially or entirely) enclosing the components described above. In addition, the computing system 500 includes circuitry 530 configured to communicate with the network 618 (shown in FIG. 6) and/or other computing devices (e.g., other mobile devices, the POS terminal 606, the interchange network 612, etc.). The circuitry 530 may include, for example, leads, connectors, NFC-enabled circuitry, Wi-Fi-enabled circuitry, and photographic element circuitry. The housing 514 is preferably configured to seal the circuitry 530, which is susceptible to degradation from the ambient environment. In one embodiment, the circuitry 530 is hermetically sealed in the housing 514. For example, in one embodiment, the circuitry 530 is completely and permanently encased within the housing 514. In other words, the housing 514 and the circuitry 530 are intended to remain as a single, inseparable unit throughout the life of the computing system 500. It is understood that the housing 514 can be formed separately from the circuitry 530 and that the circuitry 530 can be placed into and sealed within the housing 514 in a separate operation. It is also understood that the housing 514 can be oversized with respect to the circuitry 530 so that the circuitry 530 can be placed loosely into the housing 514. In another embodiment, the circuitry 530 can be selectively, sealingly enclosed within the housing 514, where the housing 514 includes a closure 516 removably attached to a body of the housing 514.

The housing 514 is fabricated from a suitably selected material that facilitates inhibiting the effect the material has on the signal being emitted from, for example, the transceiver 518 and/or the Wi-Fi component 502 and passing through the housing material. For example, and without limitation, suitable materials from which the housing 514 may be fabricated include polyethylene, propylene, isoprene, and butylenes (i.e., polyolefins). In other embodiments, the housing 514 is fabricated from any material that enables the computing system 500 to function as described herein, such as metals, etc.

In one embodiment, the transceiver 518 includes an antenna 532. The antenna 532 includes a looped wire configured to transmit radio signals when current flows through the looped wire. The antenna 532 is any size, shape, and configuration that is suitable for transmitting signals as described herein. For example, the antenna 532 is a tuned circuit configured to transmit radio signals in any radio-based communication system including, but not limited to, Radio Frequency Identification (RFID), Wireless Local Area Network (WLAN), and Wireless Personal Area Network (WPAN) systems. In the example embodiment, the antenna 532 generates a magnetic field when it vibrates at a selected frequency. Specifically, the antenna 532 is configured to vibrate at a frequency of about 13.56 MHz, which is suitable for use in a near field communication (NFC) system.

In the example embodiment, the antenna 532 transmits radio signals to and receives radio signals from other wireless-enabled computing devices, for example, another mobile device, merchant POS terminal 606, and/or any other components used in wireless systems. In NFC systems, for example, at least one NFC component generates a magnetic field to inductively transfer currents and, thereby, exchange signals and information with other NFC components positioned within the magnetic field. In one example embodiment, the antenna 532 functions as an NFC component to send and receive signals. The antenna 532 is configured to transmit radio signals to NFC components positioned within the magnetic field of the antenna 532, such as when the computing system 500 is positioned within a predetermined distance of the POS terminal 606. Therefore, the magnetic field generated by the antenna 532 defines the active range of the computing system 500. Additionally, the antenna 532 receives radio signals from NFC components when the antenna 532 is positioned within the magnetic field of the NFC components.

The transceiver 518 also includes a radio frequency (RF) interface 534 and an NFC device controller 536. The RF interface 534 and the NFC device controller 536 are powered by the power source 508, and in some embodiments, the internal power supply 510 and/or the display 520. In addition, the processor 506 and the memory device 512 are powered in the same manner. The RF interface 534 is configured to receive and transmit RF signals through the antenna 532. The NFC device controller 536 is configured to process the received RF signals and to generate signals to be transmitted by the RF interface 534. The memory device 512 is configured to store data associated with transmitting and receiving the RF signals. The NFC device controller 536 is coupled in communication with the processor 506.

In some embodiments, the computing system 500 may be connected to one or more peripheral devices (not shown). That is, the computing system 500 may communicate various data with one or more peripheral devices. For example, the computing system 500 may communicate with one or more peripheral devices through the Wi-Fi component 502, the transceiver 518, or other suitable means.

Exemplary Payment Network

Figure 6:
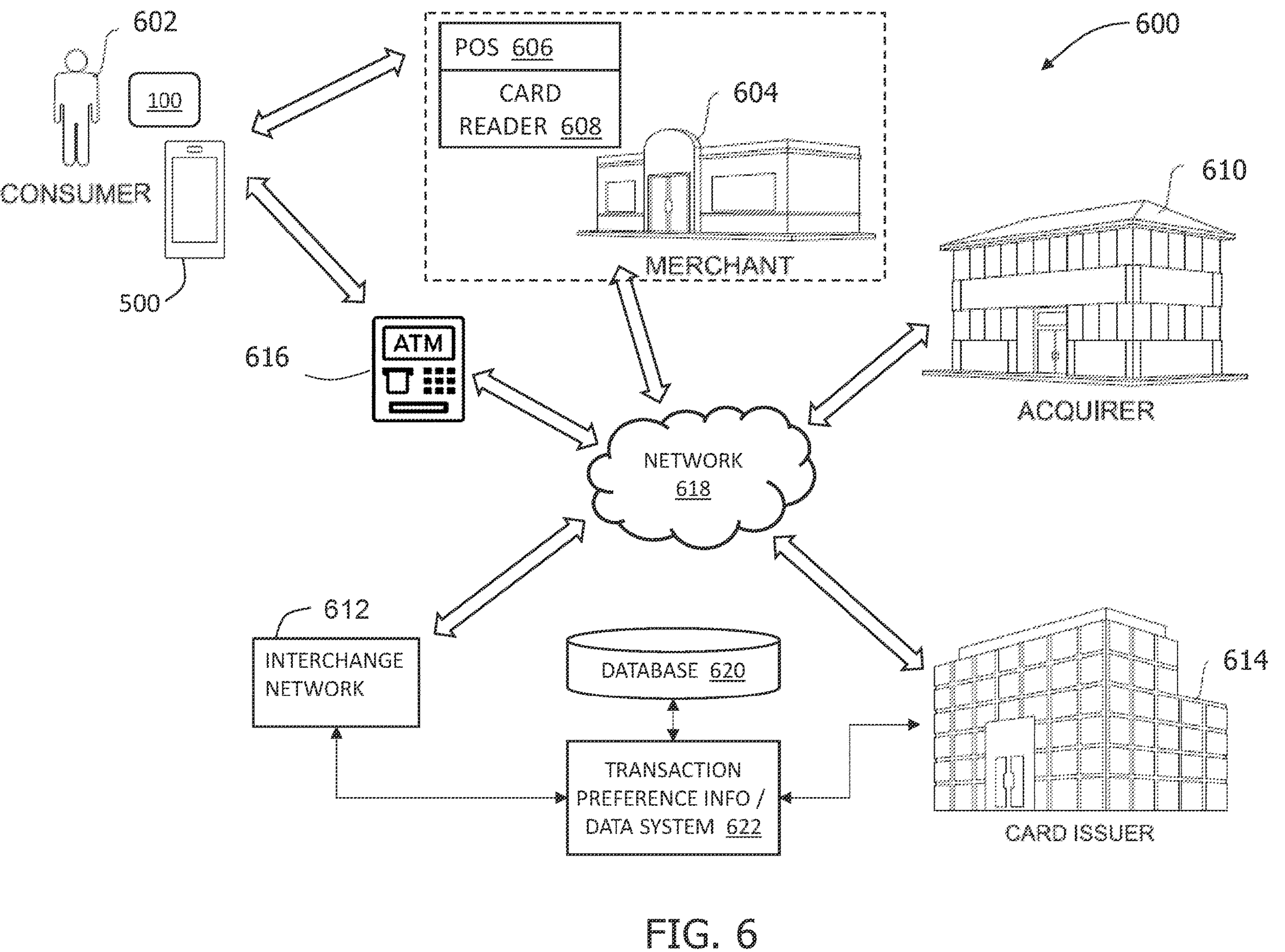
FIG. 6 is a block diagram of an exemplary payment network system that may process the payment card shown in FIG. 1.

FIG. 6 is a block diagram of an exemplary payment network system 600. In the exemplary embodiment, the payment network system 600 may be utilized, for example, by consumers and merchants as part of a process of performing transactions that include certain cardholder selected preferences. In addition, the payment network system 600 is a payment card account system including the payment card 100 and/or the computing system 500, which the cardholder 602 may use either to conduct electronic transactions and/or record payments for electronic transactions related to purchase of a merchant's goods and/or services.

The payment network system 600 enables payment by card transactions and/or payment by digital wallet transactions in which merchants 604, acquirers 610, and/or card issuers 614 do not need to have a one-to-one relationship. Although parts of the payment network system 600 are presented in one arrangement, other embodiments may include the same or different parts arranged otherwise, depending, for example, on authorization processes for purchase transactions, communication between computing devices, etc.

In the example embodiment, the payment network system 600 generally includes the payment card 100 and/or the computing system 500, the merchant 604, the acquirer 610, the issuer 614, ATMs 616, and an interchange network 612 coupled in communication via a communications network 618. The communications network 618 includes, for example and without limitation, one or more of a local area network (LAN), a wide area network (WAN) (e.g., the Internet, etc.), a mobile network, a virtual network, and/or any other suitable public and/or private network capable of facilitating communication among the payment card 100 and/or the computing system 500, the merchants 604, the acquirers 610, the issuers 614, the ATMs 616, and/or the interchange network 612. In some embodiments, the communications network 618 may include more than one type of network, such as a private payment transaction network provided by the interchange network 612 to the acquirers 610, the issuers 614, and the ATMs 616, and, separately, the public Internet, which may facilitate communication between the payment card 100 and/or the computing system 500, the merchants 604, the interchange network 612, and the acquirers 610, etc.

Embodiments described herein may relate to a payment card system, such as a credit card payment system using the Mastercard interchange network. The Mastercard interchange network is a set of proprietary communications standards promulgated by Mastercard for the exchange of financial transaction data and the settlement of funds between financial institutions that are members of Mastercard. As used herein, financial transaction data includes at least one unique primary account number (PAN) associated with an account holder using a payment card issued by an issuer and purchase data representing a purchase made by the cardholder, including a type of merchant, amount of purchase, date of purchase, and other data, which may be transmitted between any parties of the payment network system 600.

A financial institution called the "issuer" issues a payment card, such as a credit card or debit card, to a consumer such as the cardholder 602, who uses the payment card, such as the payment card 100, to tender payment for a purchase from the merchant 604. In some embodiments, it is noted that the digital wallet data 526 stored on the computing system 500 includes a digitized representation of the payment card 100. In the exemplary embodiment, the payment card 100 includes transaction preference information/data 402 (shown in FIG. 4) for use when performing a transaction. The cardholder 602 inputs information/data associated with the transaction preference information/data 402 for example, by visiting the ATM 616, a bank (e.g., the issuer 614), and/or via an online banking interface, and stores the transaction preference information/data 402 on the payment card 100, for example, in the user data memory component 222 (shown in FIG. 4). In addition, a copy of the transaction preference information/data 402 is stored by one or more of the issuer 614 and the interchange network 612 in a database 620. The database 620 is associated with a transaction preference information/data system 622.

The transaction preference information/data system 622 may be a system of the issuer 614 and/or the interchange network 612. In certain embodiments, the issuer 614 may send a copy of the transaction preference information/data 402 to the interchange network 612, which may have a duplicate transaction preference information/data system 622 configured therein.

The merchant 604 is typically associated with products, for example, and without limitation, goods and/or services, that are offered for sale and are sold to the cardholder 602. The merchant 604 includes, for example, a physical location and/or a virtual location such as an Internet-based storefront.

To accept payment from the cardholder 602, the merchant 604 establishes an account with a financial institution that is part of the payment network system 600. This financial institution is typically called the "merchant bank," the "acquiring bank," or the acquirer 610. When the cardholder 602 submits payment for a purchase with the payment card 100 and/or the computing system 500, the merchant 604 requests authorization from the acquirer 610 for the purchase. The request may be performed over a telephone but is usually performed using the POS terminal 606 that reads the cardholder's account information from the micromodule 102 (shown in FIG. 1) or the digital wallet data 526, and communicates electronically with the transaction processing computers of the acquirer 610. More specifically, the transaction data is transmitted to the merchant 604, for example, via a payment card reader 608 (broadly, a card acceptance device (CAD)) that is part of the POS terminal 606. The micromodule 102 and/or digital wallet data 526 stores more data than a magnetic stripe card and may be programmed to transmit governing rules for transactions and only relevant transaction data (e.g., selected payment account information). Known encryption techniques facilitate securing the transaction data and the processor facilitates the micromodule 102 or computing system 500 being programmed for different transaction processes.

In one example embodiment, the payment card 100 is inserted into the payment card reader 608 with a direct connection to the micromodule 102 on the surface of the payment card 100. The transmission of the transaction data (e.g., governing rules, payment account information, and/or the transaction preference information/data 402) is made via the physical contact points of the payment card reader 608 with the micromodule 102. Alternatively, in certain embodiments, the transmission of the transaction data (e.g., governing rules, payment account information, and/or the transaction preference information/data 402) may be accomplished via wireless communication with the micromodule 102 and/or the transceiver 518 of the computing system 500, such as with a contactless card (e.g., via Bluetooth communication, radio frequency (RF) communication, near field communication (NFC), and the like).

In some embodiments, the acquirer 610 may authorize a third party to perform transaction processing on its behalf. In this case, the POS terminal 606 will be configured to communicate with the third party rather than the acquirer 610, as described above. Such a third party is usually called a "merchant processor," an "acquiring processor," or a "third party processor."

Using the interchange network 612, computers of the acquirer 610 or merchant processor will communicate with computers of the issuer 614 to determine whether the cardholder's account is in good standing and whether the purchase is covered by the cardholder's available credit line. Based on these determinations being positive, the issuer 614 transmits an authorization response message, including an authorization code, to the merchant 604, for example, via the network 618.

When a request for authorization is accepted, the available credit line of the cardholder's account is decreased. Normally, a charge for a transaction is not posted immediately to the cardholder's account because bankcard associations, such as Mastercard, have promulgated rules that do not allow the merchant 604 to charge, or "capture," a transaction until the purchased goods are shipped or the purchased services are delivered. However, with respect to at least some debit card transactions, a charge may be posted at the time of the transaction. When the merchant 604 delivers the purchased products, the merchant 604 captures the transaction, for example, by appropriate data entry procedures on a point-of-sale terminal. This may include bundling of approved transactions daily for standard retail purchases. If the cardholder 602 cancels a transaction before it is captured, a "void" is generated. If the cardholder 602 returns goods after the transaction has been captured, a "credit" is generated. In some instances, if the cardholder 602 did not authorize the transaction, such as a previously cancelled recurring payment or a card-not-present account-on-file transaction, a "chargeback" is generated. The interchange network 612 and/or the issuer 614 stores the transaction card information, such as, and without limitation, a type of merchant, a merchant identifier, a location where the transaction was completed, an amount of purchase, and a date and time of the transaction, in a transaction database (not shown) associated with the interchange network 612 and/or the issuer 614 respectively.

After a purchase has been made, a clearing process occurs to transfer additional transaction data related to the purchase among the parties to the transaction, such as the acquirer 610, the issuer 614, and the interchange network 612. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

For debit card transactions, when a request for a personal identification number (PIN) authorization is approved by the issuer 614, the cardholder's account is decreased. Normally, a charge is posted immediately to the cardholder's account. The interchange network 612 transmits the approval to the acquirer 610 for distribution of goods/services or information, or cash in the case of an ATM.

After a transaction is authorized and cleared, the transaction is settled among the merchant 604, the acquirer 610, and the issuer 614. Settlement refers to the transfer of financial data or funds among the merchant's account, the acquirer 610, and the issuer 614 related to the transaction. Usually, transactions are captured and accumulated into a "batch," which is settled as a group. More specifically, a transaction is typically settled between the issuer 614 and the interchange network 612, and then between the interchange network 612 and the acquirer 610, and then between the acquirer 610 and the merchant 604. It should be appreciated that more or less information related to transactions, as part of either authorization, clearing, and/or settling, may be included in the transaction data and stored within the transaction database, at the merchant 604, the acquirer 610, the interchange network 612, and/or the issuer 614. Further, transaction data, unrelated to a particular payment account, may be collected by a variety of techniques, and similarly stored within the transaction database.

In some embodiments, the cardholder 602 involved in the transactions described herein may be prompted to agree to legal terms associated with their payment account, for example, during enrollment in such payment account, etc. As such, the cardholder 602 may voluntarily agree to allow the merchants 604, the issuers 614, the interchange network 612, etc., to utilize data collected during enrollment and/or collected relating to processing the transactions, subsequently for one or more of the purposes described herein.

FIG. 7 is a simplified block diagram of an example payment network system, such as the payment network system 600 (shown in FIG. 6), including a plurality of computing devices and the transaction preference information/data system 622. In the example embodiment, the plurality of computing devices include, for example, a processing system 702 having a server system 704, POS terminals 606 located at merchants, such as the merchant 604 (shown in FIG. 6), and client systems 706 (e.g., ATMs 616, computers, etc.) associated with merchants, merchant banks, payment networks, and/or issuer banks (e.g., the issuer 614 (shown in FIG. 6)). In one embodiment, the payment network system 600 implements a process for authenticating the payment card 100 and/or digital wallet data 526.

In the example embodiment, the transaction preference information/data system 622 is in communication with the server system 704 and may be a component of the server system 704 or a separate computing device. The transaction preference information/data system 622 is configured to receive and/or transmit the transaction preference information/data 402 (shown in FIG. 4), related to a transaction card, such as the payment card 100. The transaction preference information/data 402 includes, for example, user-selected receipt preferences, such as receipt preferences, automatic tipping, automatic rewards redemption, "round up" for charity, storing card-on-file (COF), warranty preferences, authentication preferences, and the like. The transaction preference information/data 402 is stored in the user data memory component 222 of the payment card 100 and/or a database, such as the database 620. In one embodiment, the transaction preference information/data 402 is received from one or more sources including, for example, a client system 706, an ATM 616, the user computing system 500, and the like.

In the exemplary embodiment, as described above, the processing system 702 includes the server system 704 of, for example, the interchange network 612 (shown in FIG. 6), coupled in communication with one or more POS terminals 606, one or more client systems 706 (also includes client sub-systems), one or more ATMs 616, and one or more user computing systems 500. In one embodiment, the client systems 706, ATMs 616, and user computing systems 500 are computers that include a user interface, such as a web browser, such that server system 704 is accessible to the client systems 706, ATMs 616, and user computing systems 500 using the network 618, such as the Internet. The client systems 706, ATMs 616, and user computing systems 500, respectively, are interconnected to the Internet through one or more of many interfaces including, for example, a network, such as a LAN or WAN, dial-in-connections, cable modems, special high-speed Integrated Services Digital Network (ISDN) lines, mobile phone networks, and the like. The client systems 706, ATMs 616, and user computing systems 500 are any computing device capable of interconnecting to the Internet, including an Internet connected phone (e.g., a Smartphone), a PDA, or any other suitable web-based connectable equipment.

The POS terminals 606 may be connected to the client systems 706 or may be connected to the server system 704. The POS terminals 606 may be interconnected to the Internet (or any other network that allows the POS terminals 606 to communicate as described herein) through many interfaces including a network, such as a local area network (LAN) or a wide area network (WAN), dial-in-connections, cable modems, wireless modems, and special high-speed ISDN lines. The POS terminals 606 are any computing device capable of interconnecting to the Internet and including an input device capable of reading information from a consumer's financial payment card, such as the payment card 100 and the user computing system 500. As used herein, the terms POS device, POS terminal, and point of interaction device are used broadly, generally, and interchangeably to refer to any computing device in which the cardholder 602 interacts with to complete a payment card transaction.

A database server 708 is connected to the database 620, which is configured to store information on a variety of matters, including transaction preference information/data corresponding to the payment card 100, as is described herein in greater detail. In one embodiment, the database 620 is a centralized database stored on the server system 704. The database 620 can be accessed by potential users at one of the client systems 706 and/or user computing systems 500 by logging onto the server system 704. In an alternative embodiment, the database 620 is stored remotely from the server system 704 and may be a distributed or non-centralized database.

In one example embodiment, the database 620 may include a single database having separated sections or partitions or may include multiple databases, each being separate from each other. The database 620 may store transaction data generated as part of sales activities and savings activities conducted over the processing network including data relating to merchants, account holders or customers, issuers, acquirers, savings amounts, savings account information, and/or purchases made. The database 620 may also store account data including at least one of a consumer name, a consumer address, an account number, and other account identifier data that relates the payment card 100 to the consumer, such as the cardholder 602. The database 620 may also store merchant data including a merchant identifier that identifies each merchant registered to use the network, and instructions for performing and settling transactions, including merchant bank account information. The database 620 may also store authorization request data, card authentication data, and transaction preferences information/data.

In the exemplary embodiment, one of the client systems 706 may be associated with the acquirer 610 (shown in FIG. 6) while another one of the client systems 706 may be associated with the issuer 614 (shown in FIG. 6). The POS terminal 606 may be associated with the merchant 604 (shown in FIG. 6). The server system 704 may be associated with the interchange network 612 or another payment processor (shown in FIG. 6). In the example embodiment, the server system 704 is associated with a financial transaction processing network, such as the interchange network 612, and may be referred to as an interchange computer system. The server system 704 may be used for processing card authentication data, transaction data, and transaction preference information/data, such as the transaction preference information/data 402. In addition, the client systems 706 and the POS terminals 606 may include a computer system associated with at least one of a merchant, an online bank, a bill payment outsourcer, an acquirer bank, an acquirer processor, an issuer bank associated with a payment card, an issuer processor, a remote payment processing system, a third-party aggregator, and/or a biller.

In the example embodiment, the processing system 702 is in communication with the transaction preference information/data system 622, which may be associated with the interchange network 612, the issuer 614, or with an outside third party in a contractual relationship with the interchange network 612 and/or the issuer 614. In the example embodiment, the transaction preference information/data system 622 processes transaction preferences requests and writes user-selected transaction preference information/data to payment cards, such as the payment card 100, and/or to the database 620. As such, the transaction preference information/data system 622 is configured to provide various transaction preference information/data to one or more parties involved in a transaction, such as the merchant 604 and/or the card issuer 614. It is noted that the payment network system 600 may include more, fewer, or alternative components and/or perform more, fewer, or alternative actions, including those discussed elsewhere herein.

Exemplary Computer Systems

Figure 8:
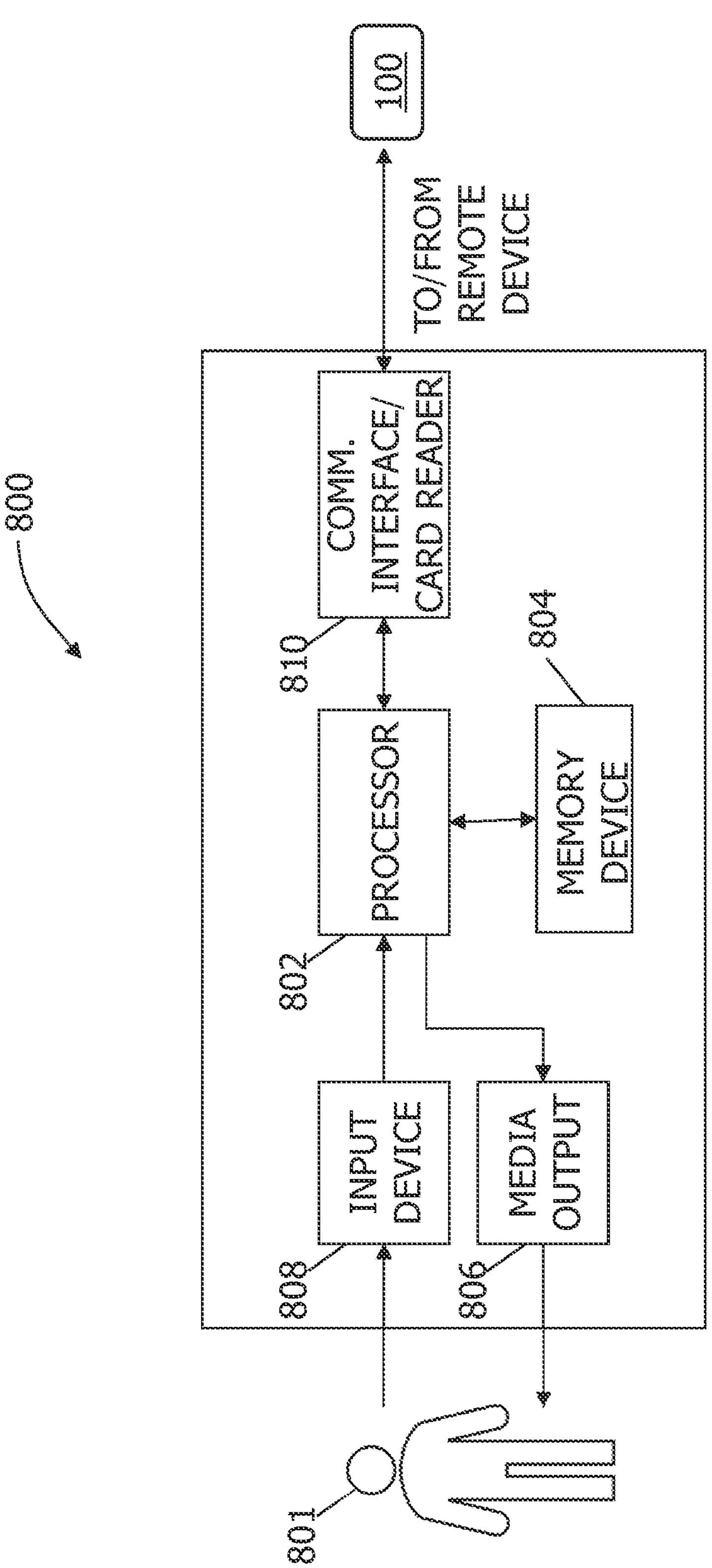
FIG. 8 is a block diagram illustrating an example computing device, such as one of the computing devices shown in FIG. 7.

FIG. 8 is an example configuration of a computing system 800 operated by a user 801, such as the cardholder 602 (shown in FIG. 6). In some embodiments, the computing system 800 is a merchant POS terminal 606, a client system 706, and/or an ATM 616. In the example embodiment, the computing system 800 includes a processor 802 for executing instructions. In some embodiments, executable instructions are stored in a memory device 804. The processor 802 includes one or more processing units, such as, a multi-core processor configuration. The memory device 804 is any device allowing information such as executable instructions and/or written works to be stored and retrieved. The memory device 804 includes one or more computer readable media.

In the example embodiment, the processor 802 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

Because the computing system 800 may be widely deployed, it may be impractical to manually update software for each computing system 800. Therefore, the computing system 800 may, in some embodiments, provide a mechanism for automatically updating the software on the computing system 800. For example, an updating mechanism may be used to automatically update any number of components and their drivers, both network and non-network components, including system level (OS) software components. In some embodiments, the computing system components are dynamically loadable and unloadable; thus, they may be replaced in operation without having to reboot the OS.

The computing system 800 also includes at least one media output component 806 for presenting information to the user 801. The media output component 806 is any component capable of conveying information to the user 801. In some embodiments, the media output component 806 includes an output adapter such as a video adapter and/or an audio adapter. An output adapter is operatively coupled to the processor 802 and operatively connectable to an output device such as a display device, for example, and without limitation, a liquid crystal display (LCD), organic light emitting diode (OLED) display, or "electronic ink" display, or an audio output device such as a speaker or headphones.

In some embodiments, the computing system 800 includes an input device 808 for receiving input from the user 801. The input device 808 may include, for example, one or more of a touch sensitive panel, a touch pad, a touch screen, a stylus, a position detector, a keyboard, a pointing device, a mouse, and an audio input device. A single component such as a touch screen may function as both an output device of the media output component 806 and the input device 808.

The computing system 800 may also include a communication interface/card reader 810, which is communicatively connectable to a remote device such as the server system 704 (shown in FIG. 7), the payment card 100, and/or the user computing system 500. The communication interface/card reader 810 may include, for example, a wired or wireless network adapter or a wireless data transceiver for use with Bluetooth communication, radio frequency (RF) communication, near field communication (NFC), and/or with a mobile phone network, Global System for Mobile communications (GSM), 4G, 5G, or other mobile data network, and/or Worldwide Interoperability for Microwave Access (WiMax) and the like.

Stored in the memory device 804 are, for example, computer readable instructions for instructing the processor 802, providing a user interface to the user 801 via the media output component 806 and, optionally, receiving and processing input from the input device 808. A user interface may include, among other possibilities, a web browser and a client application. Web browsers enable users, such as the user 801, to display and interact with media and other information typically embedded on a web page or a website from the server system 704. A client application allows the user 801 to interact with a server application associated with a merchant, such as the merchant 604 (shown in FIG. 6).

Figure 9:
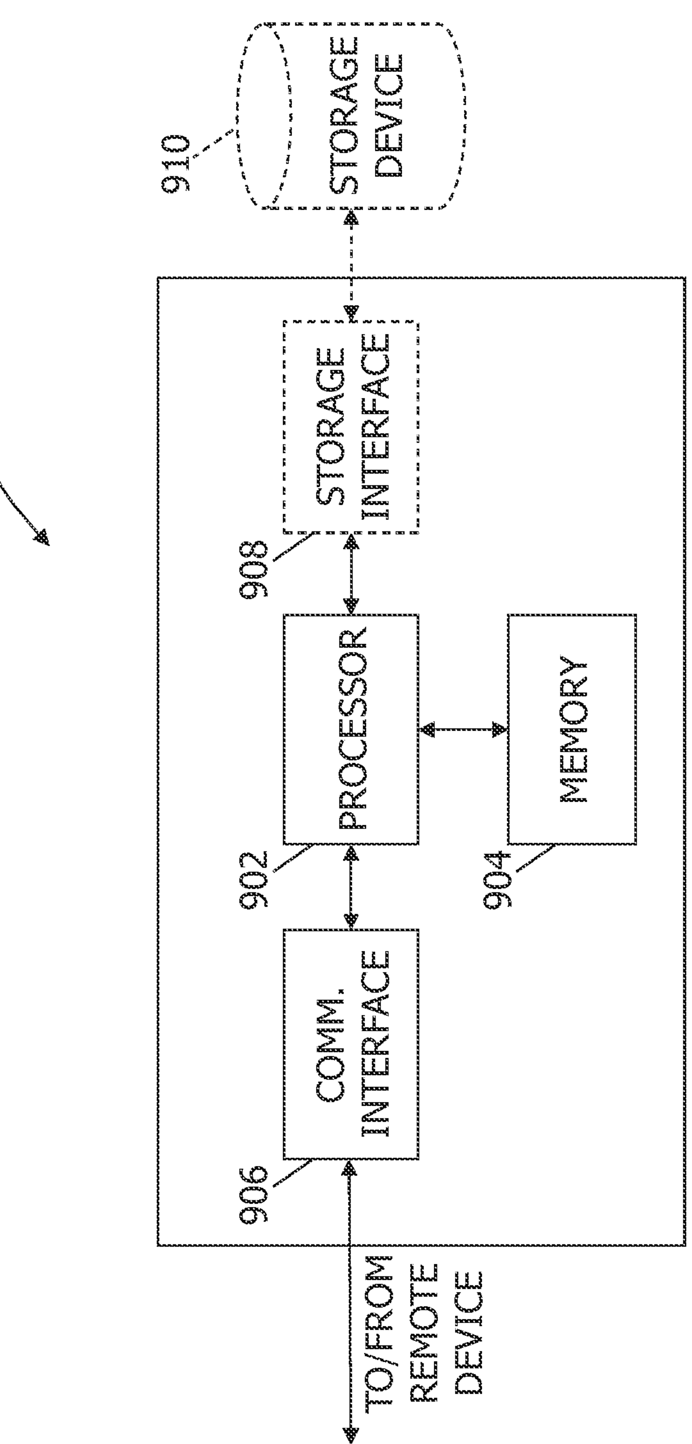
FIG. 9 is a block diagram illustrating an example server system, such as the server system shown in FIG. 7.

FIG. 9 is an example configuration of a server system 900, such as the server system 704 (shown in FIG. 7). The server system 900 includes, but is not limited to, the transaction database 620 (shown in FIGS. 6 and 7) and the transaction preference information/data system 622 (shown in FIGS. 6 and 7). In the example embodiment, the server system 900 includes a processor 902 for executing instructions. The instructions may be stored in a memory 904, for example. The processor 902 includes one or more processing units (e.g., in a multi-core configuration) for executing the instructions. The instructions may be executed within a variety of different operating systems on the server system 900, such as UNIX, LINUX, Microsoft Windows®, etc. More specifically, the instructions may cause various data manipulations on data stored in a storage device 910 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.). In the example embodiment, the processor 902 may be implemented as one or more cryptographic processors, as described above with respect to the computing system 800.

The processor 902 is operatively coupled to a communication interface 906 such that the server system 900 can communicate with a remote device such as a computing system 800 (shown in FIG. 8) or another server system. For example, the communication interface 906 may receive communications from a user computing system 500, a POS terminal 606, a client system 706, and/or an ATM 616 via the network 618, as illustrated in FIG. 6.

The processor 902 is operatively coupled to the storage device 910. The storage device 910 is any computer-operated hardware suitable for storing and/or retrieving data. In some embodiments, the storage device 910 is integrated in the server system 900. In other embodiments, the storage device 910 is external to the server system 900 and is similar to the transaction database 620. For example, the server system 900 may include one or more hard disk drives as the storage device 910. In other embodiments, the storage device 910 is external to the server system 900 and may be accessed by a plurality of server systems. For example, the storage device 910 may include multiple storage units such as hard disks or solid-state disks in a redundant array of inexpensive disks (RAID) configuration. The storage device 910 may include a storage area network (SAN) and/or a network attached storage (NAS) system.

In some embodiments, the processor 902 is operatively coupled to the storage device 910 via a storage interface 908. The storage interface 908 is any component capable of providing the processor 902 with access to the storage device 910. The storage interface 908 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 902 with access to the storage device 910.

The memory 904 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

Generating the Payment Card

Figure 10:
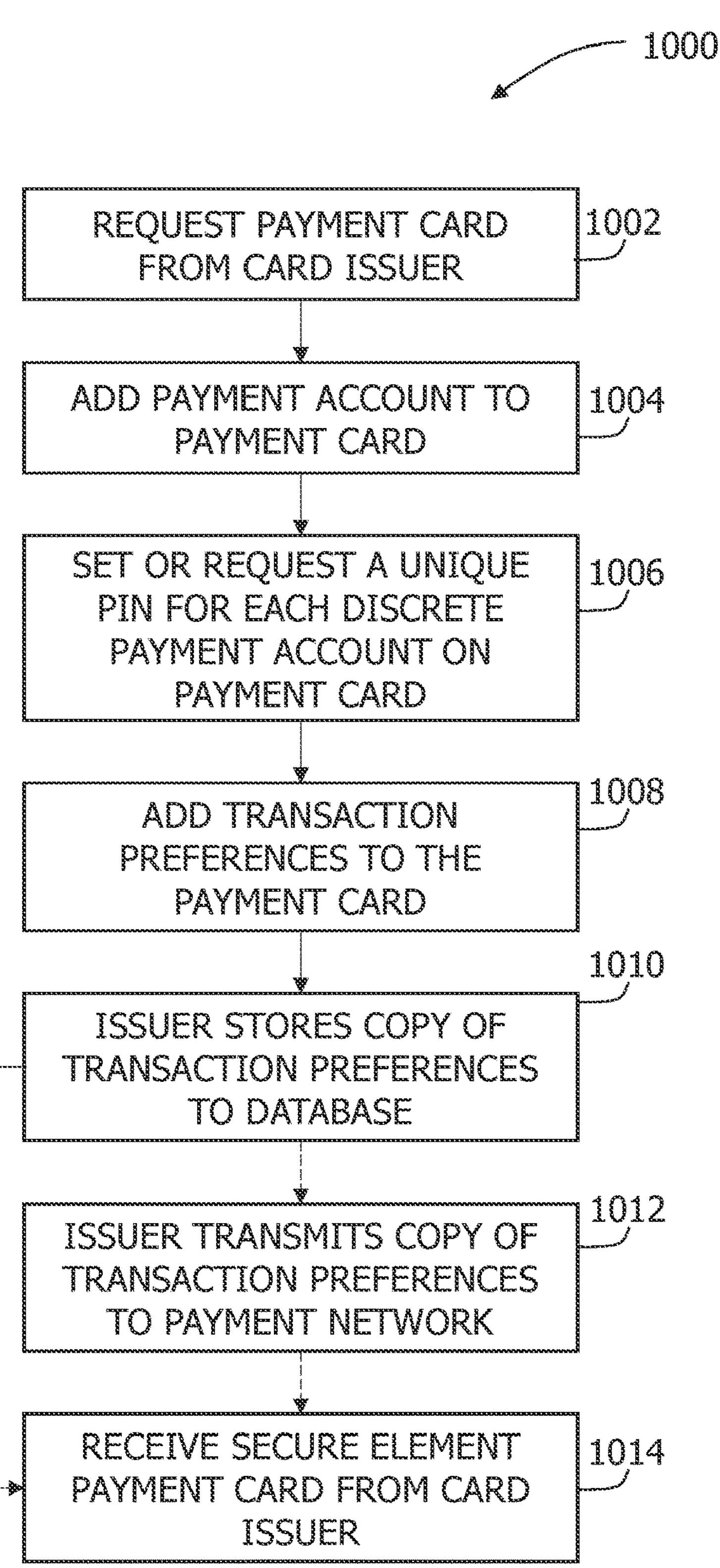
FIG. 10 is a flowchart illustrating a computer-implemented method for generating a payment card that includes cardholder-selected transaction preference information/data, such as the payment card shown in FIG. 1.

FIG. 10 is a flowchart illustrating an exemplary computer-implemented method 1000 for generating a payment card, such as the payment card 100, that includes cardholder-selected transaction preference information/data, such as the transaction preference information/data 402 (shown in FIG. 4). The operations described herein may be performed in the order shown in FIG. 10 or may be performed in a different order, unless so stated and/or except as will be readily apparent to those skilled in the art. Furthermore, according to some aspects of the present invention, some operations may be optional and may be performed concurrently as opposed to sequentially.

The computer-implemented method 1000 is described below, for ease of reference, as being executed by exemplary devices and components introduced with the embodiments illustrated in FIGS. 1-9. In embodiments, the method 1000 may be implemented by an issuer, such as the issuer 614 (shown in FIG. 6), or a payment processor, such as the interchange network 612 (shown in FIG. 6). In the exemplary embodiment, the method 1000 relates to the generation of the payment card 100 (shown in FIG. 1). While operations within the method 1000 are described below regarding the issuer 614 or interchange network 612, the method 1000 may be implemented on other computing systems and/or devices through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

The computer-implemented method 1000 facilitates a cardholder, such as the cardholder 602 (shown in FIG. 6), to request or register the payment card 100 with a card issuer. At an operation 1002, the cardholder 602 requests a payment card, such as payment card 100, from a card issuer, such as the issuer 614. The cardholder 602 may request the payment card 100, for example, using an online banking interface with the issuer 614, via an issuer telephone system, at an ATM (e.g., the ATM 616), and/or any other banking application or system of the issuer that enables the cardholder to request the payment card 100 as described herein.

During the request, the cardholder 602 may add a payment account at operation 1004, such as the payment account 302 (shown in FIG. 3), which is linked to a funding source. Various account data may be supplied to the issuer to facilitate adding a payment account to the payment card 100. For example, and without limitation, the cardholder may be asked to supply the payment account or card number (e.g., the PAN), the cardholder's name on the account, the account expiration date, a card verification value (CVV) number, and/or any other discretionary issuer data.

At operation 1006, the cardholder 602 may set (or request) a unique PIN number, such as the PIN 304, to be assigned to the payment account, such as the payment account 302, stored on the payment card 100. This facilitates providing a layer of security against unauthorized use of each distinct account stored on the payment card.

At operation 1008, the cardholder 602 may add transaction preference information/data, such as the transaction preference information/data 402 (shown in FIG. 4), to the payment card 100. Various transaction preference information/data may be supplied to the issuer to facilitate adding the transaction preference information/data 402 to the payment card 100. For example, and without limitation, the cardholder 602 may select from various transaction preferences presented to the cardholder 602 via a graphical user interface (GUI) by the issuer 614, such as receipt preferences, automatic tipping, automatic rewards redemption, "rounding up" for charity, warranty preferences, authentication preferences, store card-on-file preferences, etc. The selected transaction preferences are to be used as the transaction preference information/data 402. At operation 1010, the issuer 614 stores a copy of the transaction preference information/data 402 in the database 620. At operation 1012, the issuer may optionally provide the transaction preference information/data 402 to a payment processor, such as the interchange network 612.

In an example, transaction preferences include a cardholder's pre-selected options that may be presented to the cardholder 602 during a transaction. For example, receipt preferences may include having a paper receipt automatically printed or not printed after a transaction, having an electronic receipt provided via a selected medium (e.g., email, SMS messaging, etc.), etc. Automatic tipping preferences may include a pre-determined percentage to be added to transactions that include a tipping option. Automatic rewards redemption may include an instruction to the merchant to automatically apply any loyalty rewards and/or other rewards offerings to the transaction. "Rounding up" for charity preferences may include an instruction to the merchant's POS, such as the POS terminal 606, to automatically round up the transaction to the nearest dollar or to automatically decline the round-up option. The warranty preferences option may include an instruction to automatically add or decline extended warranty offerings presented by the merchant on certain transactions. Authentication preferences may include, for example, selection by the cardholder of a preferred authentication technique, such as via SMS message, biometrics, PIN, phone call, etc. Store card-on-file preferences may include an instruction to the merchant to automatically store the cardholder's account on file for future transactions, or an instruction to not store the account information. It is noted that transaction preferences, other than those described above, are contemplated. The above transaction preferences are exemplary only and do not describe every possible transaction preference because describing every possible transaction preference would be impractical.

At operation 1014, the cardholder 602 may receive the payment card 100 from the issuer 614 for use. Upon receipt of the payment card 100, the cardholder may activate the payment card 100 for use by verifying receipt and/or authenticating his or her identity with the card issuer 614, in any manner that is typical in the art. In the exemplary embodiment, the payment account and PIN data are stored in the primary memory component 202 of the payment card 100, whereas the transaction preference information/data 402 is stored in the user data memory component 222.

Adding and/or Updating Transaction Preference Data

Figure 11:
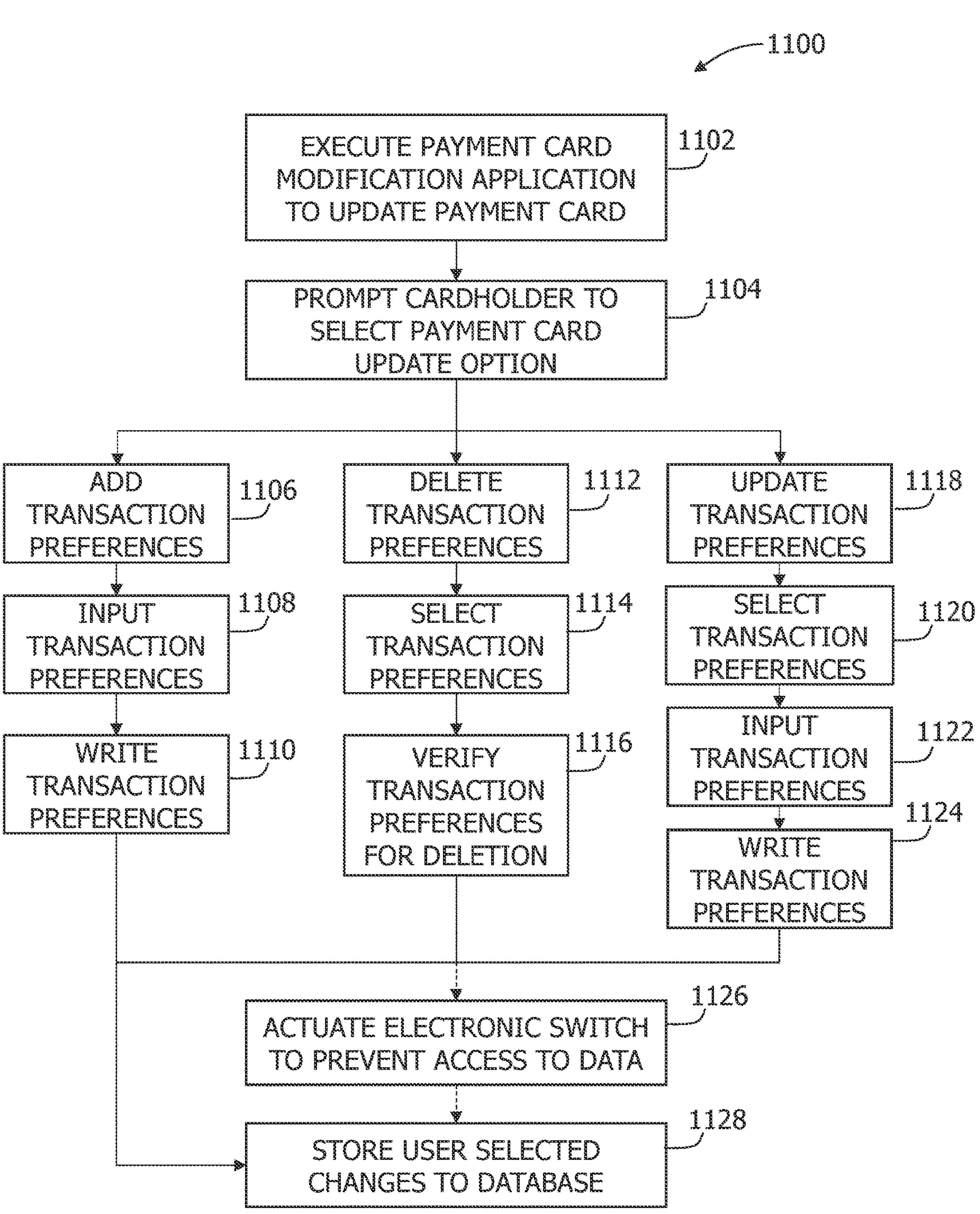
FIG. 11 is a flowchart illustrating a computer-implemented method for adding and/or updating transaction preference information/data stored on a payment card, such as the payment card shown in FIG. 1.

FIG. 11 is a flowchart illustrating an exemplary computer-implemented method 1100 for adding and/or updating transaction preference information/data stored on the payment card 100. The operations described herein may be performed in the order shown in FIG. 11 or may be performed in a different order, unless so stated and/or except as will be readily apparent to those skilled in the art. Furthermore, according to some aspects of the present invention, some operations may be optional and may be performed concurrently as opposed to sequentially.

The computer-implemented method 1100 is described below, for ease of reference, as being executed by exemplary devices and components introduced with the embodiments illustrated in FIGS. 1-9. In one embodiment, the method 1100 may be implemented by a user, such as the cardholder 602 (shown in FIG. 6). In the exemplary embodiment, the method 1100 relates to the modification of the transaction preference information/data 402 stored on the payment card 100 (shown in FIG. 1) and/or stored in the database 620 (shown in FIG. 6). While operations within the method 1100 are described below regarding the cardholder 602, the method 1100 may be implemented by the issuer 614 (shown in FIG. 3) and/or on other such computing systems and/or devices through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

The computer-implemented method 1100 facilitates a cardholder 602 adding and/or removing (broadly, updating) transaction preference information/data to/from the payment card 100. The cardholder 602 may choose to update the payment card 100 in several ways, including, for example, having the card updated by the issuing bank at a physical bank, or updating the payment card personally by using, for example, an ATM or a POS terminal.

At operation 1102, in an embodiment using an ATM and/or POS terminal, after authenticating the cardholder 602, the cardholder 602 may update the payment card 100 by running a payment card modification application (e.g., an application on the ATM 616 or the POS terminal 606 (each shown in FIG. 6)). The application may read the payment card 100, for example, using a payment card reader/writer, such as the card reader 608 (shown in FIG. 6), to load the card information into the application.

At operation 1104, a graphical user interface (GUI) of the application presents to or otherwise prompts the cardholder 602 to select an option for updating the payment card 100. For example, and without limitation, the GUI may present an Add Transaction Preferences option 1106, Delete Transaction Preferences option 1112, and an Update Transaction Preferences option 1118 to the cardholder 602.

At operation 1106, the cardholder 602 may select the Add Transaction Preferences option. At operation 1108, the cardholder 602 inputs data associated with the new transaction preference information/data to be added. The transaction preference information/data may include, for example, and without limitation, receipt preferences, automatic tipping, automatic rewards redemption, "rounding up" for charity, warranty preferences, authentication preferences, store card-on-file preferences, and/or any other discretionary transaction preferences presented to and chosen by the cardholder 602. For example, and without limitation, the cardholder 602 may input the transaction preference information/data to a computing system of the issuing bank at a physical bank location, or directly to the ATM or POS terminal. In certain embodiments, the cardholder 602 may connect to the ATM or POS terminal using his or her mobile device or data storage device (e.g., the user computing system 500 or other user device) via an internet connection, a wireless connection (e.g., NFC, and the like), or via a wired connection for transmitting the transaction preference information/data thereto. Furthermore, in other embodiments, the computing device of the issuing bank, the ATM, and/or the POS terminal may have preselected transaction preference information/data from which the cardholder 602 may select.

At operation 1110, the payment card modification application writes the new transaction preference information/data to the user data memory component 222 of the payment card 100. For example, in an embodiment, the payment card modification application issues a command to the operating system 316 (shown in FIG. 3) to actuate (e.g., close) the electronic switch 224 (shown in FIG. 2), thereby closing the circuit and enabling the operating system to read/write to the user data memory component 222. In other embodiments, access to the user data memory component 222 may not be protected by an electronic switch, such as the electronic switch 224.

At operation 1112, the cardholder 602 may select the Delete Transaction Preferences option. At operation 1114, the cardholder 602 is presented with one or more of the transaction preferences stored on the payment card 100 and selects the preferred transaction preference(s) for deletion, for example, by selecting a check box by a respective transaction preference. After selection of the preferred transaction preference(s) for deletion, the cardholder 602 may be prompted to verify the selection at operation 1116 prior to the transaction preferences being deleted. Verification of the selection(s) facilitates inadvertent deletion of transaction preferences by the cardholder 602.

At operation 1118, the cardholder 602 may select the Update Transaction Preferences option. At operation 1120, the cardholder 602 is presented with one or more of the transaction preferences stored on the payment card 100. The cardholder 602 selects the preferred transaction preference (s) and inputs data associated with a new transaction preference (e.g., changing receipt preferences from "no receipt" to "print receipt"), as described above, to update the currently selected transaction preference at operation 1122. As described above, the new transaction preferences information/data may include, for example, and without limitation, receipt preferences, automatic tipping, automatic rewards redemption, "rounding up" for charity, warranty preferences, authentication preferences, store card-on-file preferences, and/or any other discretionary transaction preferences presented to and chosen by the cardholder 602. At operation 1124, the payment card modification application writes the updated transaction preference(s) to the user data memory component 222 of the payment card 100, as described above, replacing and/or overwriting the previous transaction preference(s) stored thereon.

Optionally, at operation 1126, the payment card modification application issues a command to the operating system to actuate (e.g., open) the electronic switch 224, thereby preventing access to the user data memory component 222. This facilitates preventing unrequested changes to the transaction preferences information/data. At operation 1128, the payment card modification application writes the changes to the database 620.

Figure 12:
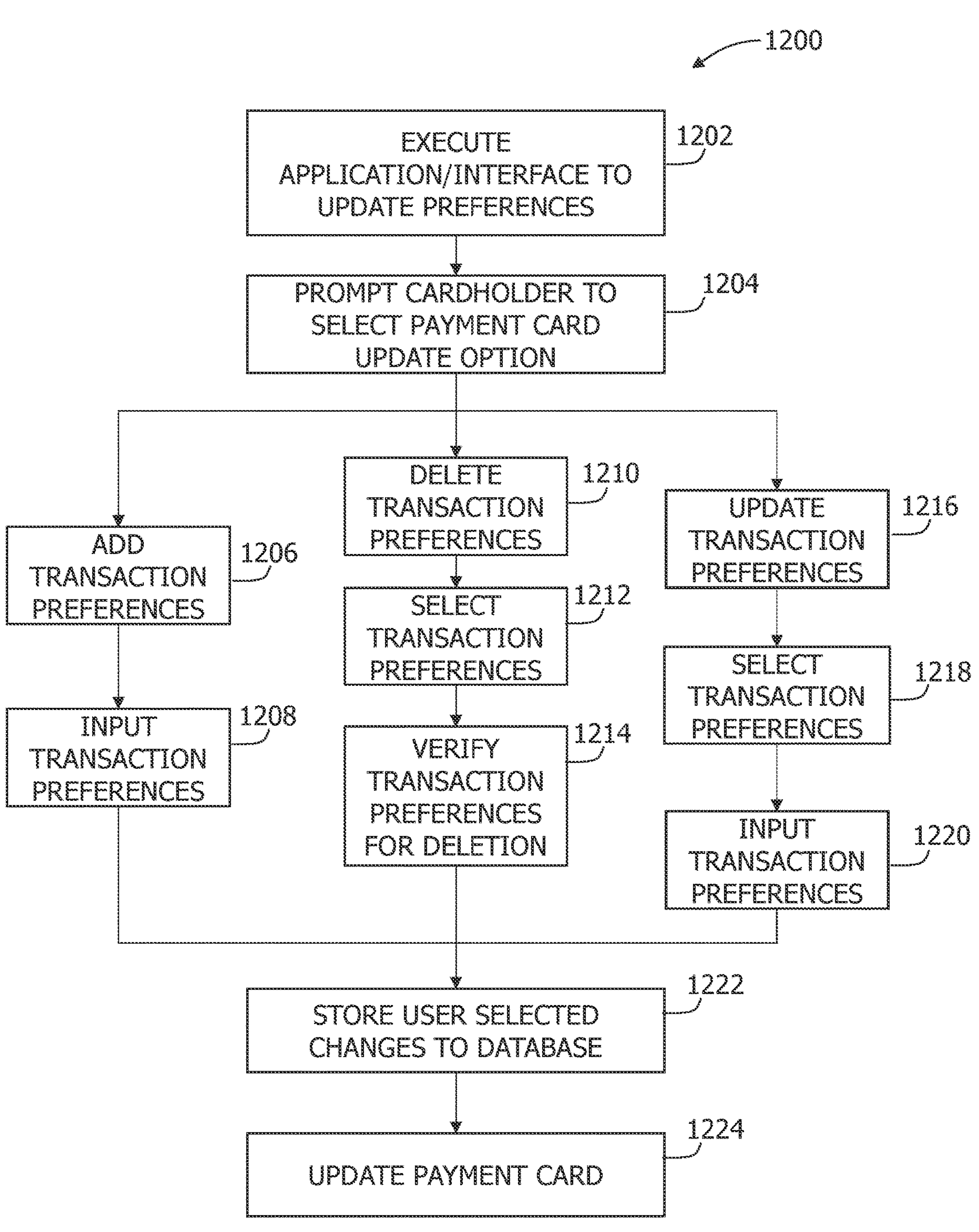
FIG. 12 is a flowchart illustrating a computer-implemented method for updating transaction preference information/data stored on a database shown in FIG. 6.

FIG. 12 is a flowchart illustrating an exemplary computer-implemented method 1200 for updating transaction preference information/data stored on the database 620 and associated with the cardholder's payment account, such as the payment account 302. The operations described herein may be performed in the order shown in FIG. 12 or may be performed in a different order, unless so stated and/or except as will be readily apparent to those skilled in the art. Furthermore, according to some aspects of the present invention, some operations may be optional and may be performed concurrently as opposed to sequentially.

The computer-implemented method 1200 is described below, for ease of reference, as being executed by exemplary devices and components introduced with the embodiments illustrated in FIGS. 1-9. In one embodiment, the method 1200 may be implemented by a user, such as the cardholder 602 (shown in FIG. 6). In the exemplary embodiment, the method 1200 relates to the modification of the transaction preference information/data stored in the database 620 (shown in FIG. 6). While operations within the method 1200 are described below regarding the cardholder 602, the method 1200 may be implemented by the issuer 614 (shown in FIG. 3) and/or on other computing systems and/or devices through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

The computer-implemented method 1200 facilitates a cardholder 602 adding, removing, and/or updating transaction preference information/data associated with the cardholder's payment account. The cardholder 602 may update the transaction preference information/data via his or her user computing system 500 or other computing device by using a banking application, web interface, and the like.

At operation 1202, after authenticating the cardholder 602, the cardholder 602 may update the transaction preferences information/data by running an application/interface (e.g., an application on the user computing system 500 or via a web interface of an issuer of the payment account). At operation 1204, a graphical user interface (GUI) of the application/interface presents to or otherwise prompts the cardholder 602 to select an option for updating the transaction preferences information/data. For example, and without limitation, the GUI may present an Add Transaction Preferences option 1206, Delete Transaction Preferences option 1212, and an Update Transaction Preferences option 1218 to the cardholder 602.

At operation 1206, the cardholder 602 may select the Add Transaction Preferences option. At operation 1208, the cardholder 602 inputs data associated with the new transaction preference information/data to be added. The transaction preference information/data may include, for example, and without limitation, receipt preferences, automatic tipping, automatic rewards redemption, "rounding up" for charity, warranty preferences, authentication preferences, store card-on-file preferences, and/or any other discretionary transaction preferences presented to and chosen by the cardholder 602. For example, and without limitation, the cardholder 602 may input the transaction preference information/data to a computing system of the issuing bank at a physical bank location or via a user computing device.

At operation 1210, the cardholder 602 may select the Delete Transaction Preferences option. At operation 1212, the cardholder 602 is presented with one or more of the transaction preferences stored in the database 620 and selects the preferred transaction preference(s) for deletion, for example, by selecting a check box by a respective transaction preference. After selection of the preferred transaction preference(s) for deletion, the cardholder 602 may be prompted to verify the selection at operation 1214 prior to the transaction preferences being deleted. Verification of the selection(s) facilitates inadvertent deletion of transaction preferences by the cardholder 602.

At operation 1216, the cardholder 602 may select the Update Transaction Preferences option. At operation 1218, the cardholder 602 is presented with one or more of the transaction preferences stored in the database 620. The cardholder 602 selects the preferred transaction preference(s) and inputs data associated with a new transaction preference (e.g., changing receipt preferences from "no receipt" to "print receipt"), as described above, to update the currently selected transaction preference at operation 1220. As described above, the new transaction preferences information/data may include, for example, and without limitation, receipt preferences, automatic tipping, automatic rewards redemption, "rounding up" for charity, warranty preferences, authentication preferences, store card-on-file preferences, and/or any other discretionary transaction preferences presented to and chosen by the cardholder 602. At operation 1222, the payment card modification application writes the changes to the database 620. As described above, the transaction preferences information/data stored in the database 620 may be used in a transaction flow where the cardholder uses his or her digital wallet rather that a physical payment card.

Optionally, at operation 1224, the payment card, such as the payment card 100, may be updated with the transaction preference information/data. For example, when the payment card 100 is inserted into the ATM 616 and/or another payment card reader/writer 608 (e.g., a POS terminal 606), the plurality of electrical contacts 104 of the micromodule 102 come into contact with corresponding contacts of the reader/writer device 608. A copy of the transaction preferences stored in the database 620 may be written to the payment card 100. Alternatively, wireless communications may be used with some payment cards to read/write data to and from the payment card. The reader/writer may then write the changes requested by the cardholder 602 to the payment card 100 wirelessly.

Figure 13:
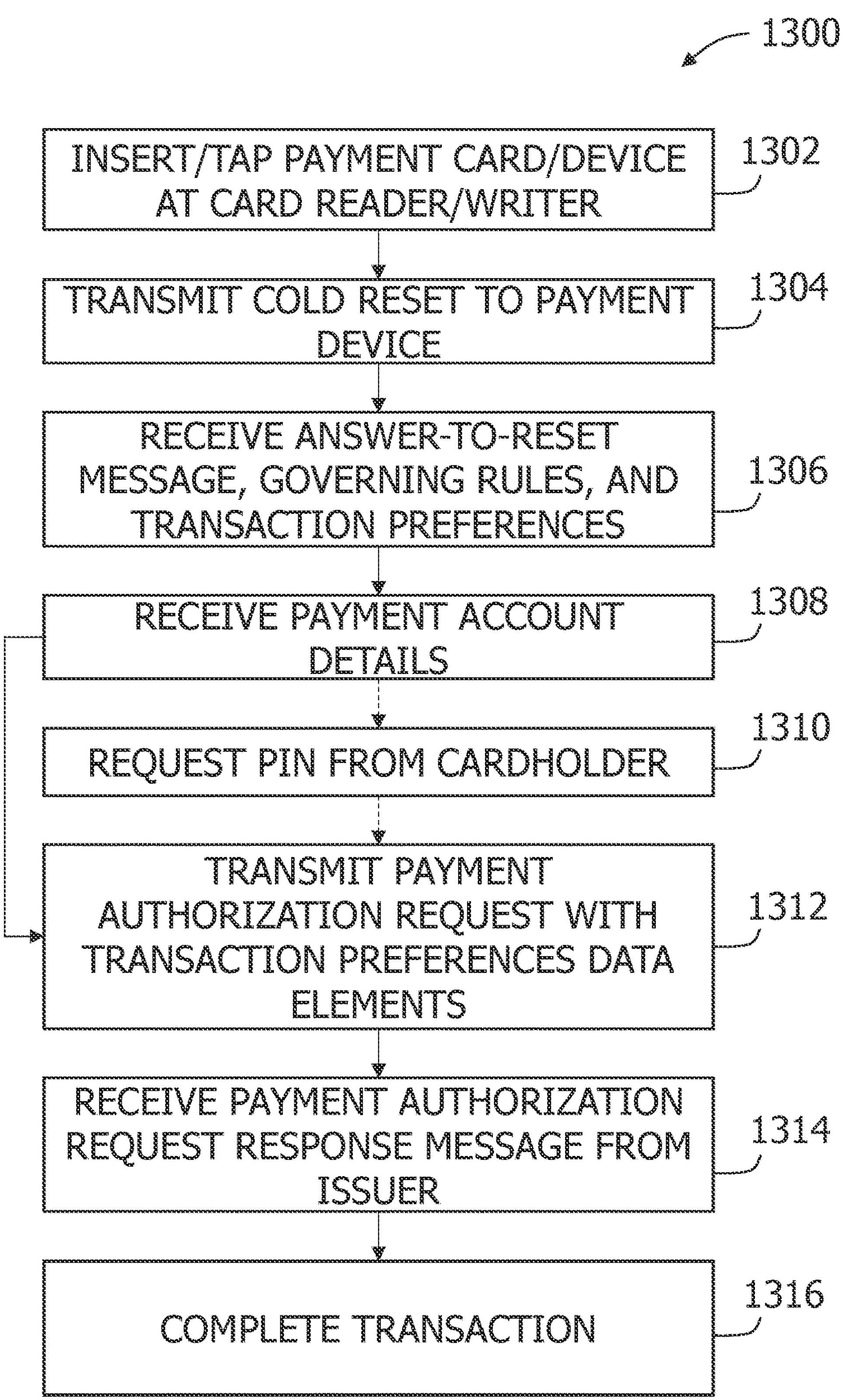
FIG. 13 is a flowchart illustrating a computer-implemented method for performing a transaction with user-selected transaction preferences stored on a payment card, such as the payment card shown in FIG. 1.

Exemplary Computer-Implemented Method for Performing a Transaction with User-Selected Transaction Preferences FIG. 13 is a flowchart illustrating an exemplary computer-implemented method 1300 for performing a transaction with user-selected transaction preferences, such as the transaction preference information/data 402 stored on the payment card 100. As described herein, an example transaction is performed using a payment card, such as the payment card 100 (shown in FIG. 1). The operations described herein may be performed in the order shown in FIG. 13 or may be performed in a different order, unless so stated and/or except as will be readily apparent to those skilled in the art. Furthermore, according to some aspects of the present invention, some operations may be optional and may be performed concurrently as opposed to sequentially.

The computer-implemented method 1300 is described below, for ease of reference, as being executed by exemplary devices and components introduced with the embodiments illustrated in FIGS. 1-9. In one embodiment, the method 1300 may be implemented by a merchant, such as the merchant 604 (shown in FIG. 6). In the exemplary embodiment, the method 1300 relates to a transaction using the transaction preference information/data 402 stored on the payment card 100. While operations within the method 1300 are described below regarding the merchant 604, the method 1300 may be implemented by any other party to the transaction and/or on other computing systems and/or devices through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

In an exemplary transaction, a cardholder, such as the cardholder 602 shown in FIG. 6, is shopping at a merchant, such as the merchant 604. The cardholder 602 is using the payment card 100, which includes a payment account 302 and transaction preference information/data 402. After the cardholder 602 has selected an item to purchase, the cardholder proceeds to pay for the item.

At operation 1302, the cardholder 602 inserts or taps the payment card 100 at the merchant POS terminal 606 (shown in FIG. 6). The card reader/writer 608 (shown in FIG. 6) reads the payment card 100. For example, at operation 1304, the card reader/writer 608 transmits a cold reset signal to the micromodule 102 (shown in FIG. 1) of the payment card 100. This initial reset signal is a "cold reset" as defined by ISO/IEC 7816-3 standard and Part I of the EMV Integrated Circuit Card for Payment Systems Specification. For example, a cold reset is defined as a reset following the activation of the electrical contacts of a payment card (i.e., after the initial application of power and clock signals to the contacts), whereas a warm reset is defined as a reset following a cold reset while the power and clock signals are still applied to the payment card.

The payment card 100 responds with an Answer-to-Reset (ATR) message at operation 1306. The ATR message informs the POS terminal 606 of the governing rules for communication with the payment card 100 and performing the transaction. For example, the governing rules include the transaction preferences information/data 402. An example rule may indicate that card authentication is required and the transaction preferences information/data 402 may indicate a preferred method for authenticating the card when authenticating the transaction. Furthermore, as described above, the transaction preferences information/data may include governing rules related to receipt preferences, automatic tipping, automatic rewards redemption, "rounding up" for charity, warranty preferences, authentication preferences, store card-on-file preferences, and/or any other discretionary transaction preferences selected the cardholder 602. In some instances, the transaction preferences information/data 402 instruct the POS terminal to perform certain functions automatically, such as printing a receipt, "rounding up," etc. In other instances, the transaction preferences information/data 402 may be transmitted to the interchange network and/or issuer as data elements in the transaction message flow. These data elements may be associated with instructions for the interchange network or issuer to perform certain functions associated with the transaction, such as performing user-preferred authentication methods, etc. It is contemplated that the transaction preferences information/data 402 may include preferences performed by one or more of the merchant (via the POS terminal), the interchange network, and the issuer.

At operation 1308, the POS terminal 606 receives the payment account details of the payment account 302 from the payment card 100. In certain embodiments, at operation 1310, the POS terminal 606 requests the PIN 304 associated with the payment account 302.

In the exemplary embodiment, at operation 1312, the POS terminal 606 transmits a payment authorization request message including one or more data elements associated with the transaction preferences information/data 402. For example, the payment authorization request message may include a data element that indicates that authentication is to be performed by an SMS message to a selected mobile device number. It is noted that the messages within an interchange network such the interchange network 612 (shown in FIG. 6), in at least some instances, conform to the International Organization for Standardization (ISO) Standard 8583, Financial transaction card originated messages—Interchange message specifications, which is the ISO standard for systems that exchange electronic transactions made by cardholders using payment cards. In the example embodiment, the payment authorization request message is an ISO 8583 message type identifier (MTI) "0100" message. The POS terminal 406 generates the payment authorization request message including, for example, data corresponding to a terminal ID, date of transaction, merchant location, one or more data elements associated with the transaction preferences information/data 402, and other discretionary data. The payment authorization request message is transmitted to the interchange network 612 for processing and further transmission to an issuing bank, such as the issuer 614 (shown in FIG. 6), for approval.

At operation 1314, the POS terminal 606 receives a payment authorization request response message from the issuer 614, based on the transaction preference information/data 402 data elements provided, for example, approving the transaction after performing one or more of the transaction preferences information/data 402. In the example embodiment, the payment authorization request response message is an ISO 8583 message type identifier (MTI) "0110" message. At operation 1316, after receiving an "0110" payment authorization request response message approving the transaction, the merchant 604 completes the transaction. The POS terminal 606 executes any transaction preferences provided by the payment card 100, such as not printing a paper receipt, etc. Otherwise, if the payment authorization request response message received from the issuer 614 indicates that the transaction request is declined, the merchant cancels the transaction.

Figure 14:
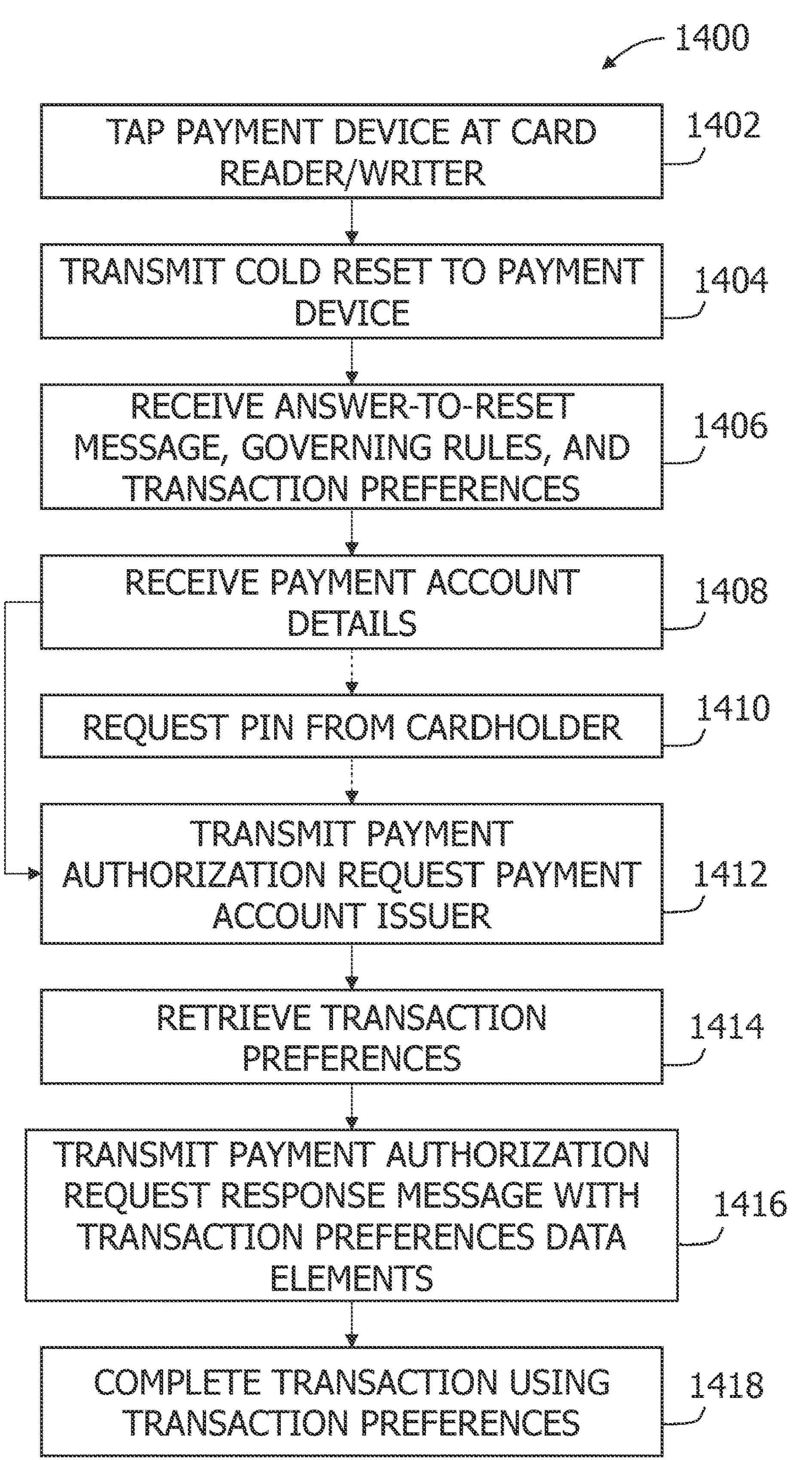
FIG. 14 is a flowchart illustrating a computer-implemented method for performing a transaction with user-selected transaction preferences stored on a database, such as the database shown in FIG. 6.

FIG. 14 is a flowchart illustrating an exemplary computer-implemented method 1400 for performing a transaction with user-selected transaction preferences, such as the transaction preference information/data stored in the database 620. As described herein, an example transaction is performed using digital wallet data, such as the digital wallet data 526 stored on the user computing system 500. The operations described herein may be performed in the order shown in FIG. 14 or may be performed in a different order, unless so stated and/or except as will be readily apparent to those skilled in the art. Furthermore, according to some aspects of the present invention, some operations may be optional and may be performed concurrently as opposed to sequentially.

The computer-implemented method 1400 is described below, for ease of reference, as being executed by exemplary devices and components introduced with the embodiments illustrated in FIGS. 1-9. In one embodiment, the method 1400 may be implemented by a merchant, such as the merchant 604 (shown in FIG. 6). In the exemplary embodiment, the method 1400 relates to a transaction using the transaction preference information/data 402 stored in the database 620. While operations within the method 1400 are described below regarding the merchant 604, the method 1400 may be implemented by any other party to the transaction and/or on other computing systems and/or devices through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

In an exemplary transaction, a cardholder, such as the cardholder 602 shown in FIG. 6, is shopping at a merchant, such as the merchant 604. The cardholder 602 is using the digital wallet data 526 stored on the user computing system 500, which includes a payment account 302 and transaction preference information/data 402. After the cardholder 602 has selected an item to purchase, the cardholder proceeds to pay for the item.

At operation 1402, the cardholder 602 taps the user computing system 500 at the merchant POS terminal 606 (shown in FIG. 6). The card reader/writer 608 (shown in FIG. 6) reads the digital wallet data 526 from the user computing system 500. For example, at operation 1404, the card reader/writer 608 transmits a cold reset signal to the user computing system 500. This initial reset signal is a "cold reset" as defined by ISO/IEC 7816-3 standard and Part I of the EMV Integrated Circuit Card for Payment Systems Specification. For example, a cold reset is defined as a reset following the activation of the electrical contacts of a payment card (i.e., after the initial application of power and clock signals to the contacts), whereas a warm reset is defined as a reset following a cold reset while the power and clock signals are still applied to the payment card.

The user computing system 500 responds with an Answer-to-Reset (ATR) message at operation 1406. The ATR message informs the POS terminal 606 of the governing rules for communication with and performing the transaction, such as an application to run to setup a payment environment for a wireless transaction.

At operation 1408, the POS terminal 606 receives the payment account details of the payment account 302 from the user computing device 500, and more particularly, the digital wallet data 526. In certain embodiments, at operation 1410, the POS terminal 606 requests the PIN 304 associated with the payment account 302.

In the exemplary embodiment, at operation 1412, the POS terminal 606 transmits a payment authorization request message to the payment account issuer. It is noted that the messages within an interchange network such the interchange network 612 (shown in FIG. 6), in at least some instances, conform to the International Organization for Standardization (ISO) Standard 8583, Financial transaction card originated messages-Interchange message specifications, which is the ISO standard for systems that exchange electronic transactions made by cardholders using payment cards. In the example embodiment, the payment authorization request message is an ISO 8583 message type identifier (MTI) "0100" message. The POS terminal 406 generates the payment authorization request message including, for example, data corresponding to the payment account 302 (e.g., a PAN, a payment token, etc.), a terminal ID, date of transaction, merchant location, and other discretionary data. The payment authorization request message is transmitted to the interchange network 612 for processing and further transmission to an issuing bank, such as the issuer 614 (shown in FIG. 6), for approval.

At operation 1414, the interchange network retrieves transaction preference information/data 402 that is associated with the payment account 302 from the database 620. The transaction preference information/data 402 includes various user-selected rules for use with a transaction. For example, an example rule may indicate that payment device authentication is required and the transaction preferences information/data 402 may indicate a preferred method for authenticating the device when authenticating the transaction. Furthermore, as described above, the transaction preferences information/data 402 may include rules related to receipt preferences, automatic tipping, automatic rewards redemption, "rounding up" for charity, warranty preferences, authentication preferences, store card-on-file preferences, and/or any other discretionary transaction preferences selected the cardholder 602. In some instances, the transaction preferences information/data 402 may include instructions for the POS terminal to perform certain functions automatically, such as printing a receipt, "rounding up," etc. In other instances, the transaction preferences information/data 402 may include instructions for the interchange network and/or issuer to perform certain functions associated with the transaction, such as performing user-preferred authentication methods, etc. It is contemplated that the transaction preferences information/data 402 may include preferences performed by one or more of the merchant (via the POS terminal), the interchange network, and the issuer.

At operation 1416, the interchange network 612 transmits to the POS terminal 606, a payment authorization request response message from the issuer 614. In particular, the payment authorization request response message includes one or more data elements associated with the transaction preferences information/data 402. For example, the payment authorization request response message may include a data element that indicates that the POS terminal is not to print a paper receipt for the transaction, is to add a tip to a transaction that allows for tips, etc. In the example embodiment, the payment authorization request response message is an ISO 8583 message type identifier (MTI) "0110" message.

At operation 1418, after receiving an "0110" payment authorization request response message approving the transaction, the merchant 604 completes the transaction. The POS terminal 606 executes any transaction preferences provided by the transaction preferences included in the data elements of the payment authorization request response message, such as not printing a paper receipt, etc. Otherwise, if the payment authorization request response message received from the issuer 614 indicates that the transaction request is declined, the merchant cancels the transaction.

Any actions, functions, operations, and the like recited herein may be performed in the order shown in the figures and/or described above or may be performed in a different order. Furthermore, some operations may be performed concurrently as opposed to sequentially. Although the methods are described above, for the purpose of illustration, as being executed by an example system and/or example physical elements, it will be understood that the performance of any one or more of such actions may be differently distributed without departing from the spirit of the present invention.

A computer-readable storage media or medium comprising a non-transitory medium may include an executable computer program stored thereon and for instructing one or more processing elements to perform some or all of the operations described herein, including some or all of the operations of the computer-implemented method. The computer program stored on the computer-readable medium may instruct the processor and/or other components of the system to perform additional, fewer, or alternative operations, including those discussed elsewhere herein.

Additional Considerations

All terms used herein are to be broadly interpreted unless otherwise stated. For example, the term "payment card" and the like may, unless otherwise stated, broadly refer to substantially any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transaction card can be used as a method of payment for performing a transaction.

As used herein, the term "cardholder" may refer to the owner or rightful possessor of a payment card. As used herein, the term "cardholder account" may refer specifically to a PAN or more generally to an account a cardholder has with the payment card issuer and that the PAN is or was associated with. As used herein, the term "merchant" may refer to a business, a charity, or any other such entity that can generate transactions with a cardholder account through a payment card network.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor includes a general-purpose processor configured using software, the general-purpose processor may be configured as respective different processors at separate times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at separate times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a specific location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

1. A system comprising:

a payment card having a micromodule, the micromodule comprising a primary memory component storing payment account details for a payment account, a PIN associated with the payment account, and governing rules for performing a transaction, the governing rules including user-selected transaction preferences data associated with one or more user-selected transaction preferences for performing a transaction;

a point-of-sale device comprising a processor and a payment card reader/writer component, said processor programmed by computer-executable instructions to:

transmit a cold reset signal to the micromodule;

receive an answer-to-reset message from the micromodule, the answer-to-reset message including the user-selected transaction preferences data;

receive the payment account details from the micromodule;

transmit a payment authorization request message to an interchange network, the payment authorization request message including one or more data elements associated with the user-selected transaction preferences data;

receive a payment authorization request response message, based on the user-selected transaction preferences data, from the interchange network; and execute one or more of the user-selected transaction preferences, the user-selected transaction preferences including discretionary transaction functions selected by a cardholder, including one or more of the following: receipt preferences, automatic tipping, automatic rewards redemption, "rounding up" for charity, warranty preferences, authentication preferences, and store card-on-file preferences, wherein the payment authorization request response message is an ISO 8583 message type identifier (MTI) "0110" message, the payment card further comprising:

a user data memory component storing the user-selected transaction preferences data; and an electronic switch disposed between the user data memory component and a system bus of the micromodule and configured to open and close a circuit coupled to the user data memory component only when certain requirements are met, the electronic switch being actuated by a processor of the micromodule to selectively couple the user data memory component to the system bus to enable access to the user-selected transaction preferences data.

2. The system in accordance with claim 1, the payment card reader/writer component configured to receive, from the cardholder, the payment card.

3. The system in accordance with claim 1, the processor further programmed to generate the payment authorization request message, the payment authorization request message comprising an ISO 8583 message type identifier (MTI) "0100" message.

4. The system in accordance with claim 1, the processor further programmed to receive the PIN from the point-of-sale device via input into the point-of-sale device.

5. The system in accordance with claim 1, wherein, in receiving the user-selected transaction preferences data from the micromodule, the processor is programmed to receive the user-selected transaction preferences data from the user data memory component of the payment card.

* * * * *